United States Patent [19]
Russell et al.

[11] Patent Number: 5,526,407
[45] Date of Patent: Jun. 11, 1996

[54] METHOD AND APPARATUS FOR MANAGING INFORMATION

[75] Inventors: Steven P. Russell, Menlo Park; Michael V. McCusker, Los Altos, both of Calif.

[73] Assignee: Riverrun Technology, Menlo Park, Calif.

[21] Appl. No.: 210,318

[22] Filed: Mar. 17, 1994

Related U.S. Application Data

[63] Continuation-in-part of Ser. No. 768,828, Sep. 30, 1991, abandoned.

[51] Int. Cl.$^6$ .................................................... H04M 1/64
[52] U.S. Cl. ........................... 379/89; 379/96; 379/67; 381/43; 381/44; 395/2
[58] Field of Search .................... 379/67, 88, 89, 379/96; 381/43, 44; 395/2

[56] References Cited

U.S. PATENT DOCUMENTS

| | | | |
|---|---|---|---|
| 4,425,586 | 1/1984 | Miller | 358/335 |
| 4,627,001 | 12/1986 | Stapleford et al. | 364/513.5 |
| 4,641,203 | 2/1987 | Miller | 358/335 |
| 4,837,798 | 6/1989 | Cohen et al. | 379/94 |
| 4,841,387 | 6/1989 | Rindfuss | 360/72.1 |
| 4,924,387 | 5/1990 | Jeppesen | 364/409 |
| 5,003,577 | 3/1991 | Ertz et al. | 379/96 |
| 5,119,474 | 6/1992 | Beitel et al. | 395/161 |

FOREIGN PATENT DOCUMENTS

| | | | |
|---|---|---|---|
| 0402911A | 2/1990 | European Pat. Off. | G06F 3/16 |

OTHER PUBLICATIONS

D. Terry and D. Swinehart, "Managing Stored Voice in the Etherphone System," ACM Transactions on Computer Systems, vol. 6/No.1/Feb. '88/3–2.

International Search Report for related PCT International Application No. PCT/US92/08299.

International Preliminary Examination Report for related PCT International Application No. PCT/US92/08299.

*Primary Examiner*—Jeffrey Hofsass
*Assistant Examiner*—Fan Tsang
*Attorney, Agent, or Firm*—Feix & Feix

[57] ABSTRACT

A method and apparatus for recording, categorizing, organizing, managing and retrieving speech information obtains a speech stream; stores the speech stream in at least a temporary storage; provides a visual representation of portions of the speech stream to the user; categorizes portions of a speech stream, with or without the aid of the visual representation, by user command and/or by automatic recognition of speech qualities; stores, in at least a temporary storage, structure which represents a categorized portions of the speech stream; and selectively retrieves one or more of the categorized portions of the Speech stream.

57 Claims, 21 Drawing Sheets

LOGICAL PROCESSING IN SPEECH PERIPHERAL

FIG 13

Objectives

CSFs

Obstacles

Chuck

Hal

European
issues

Chuck

Mike

88 — *Reciprocal Agreements*

Mfg

Sales

FIG 17
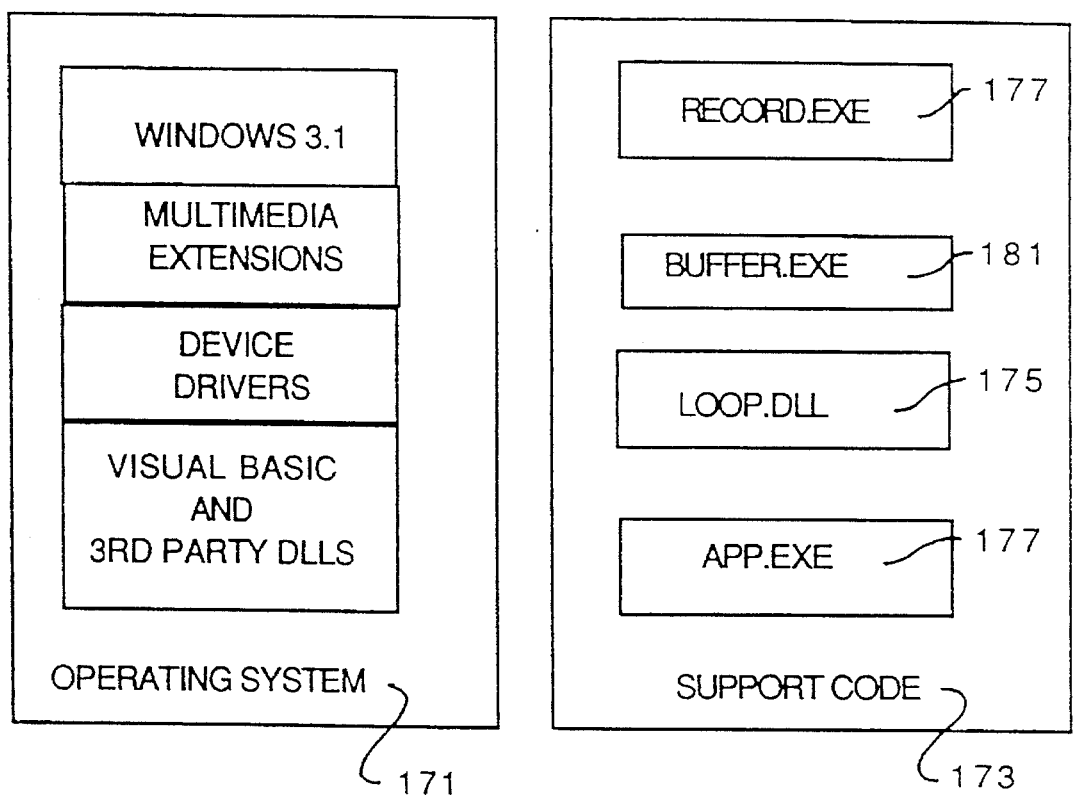
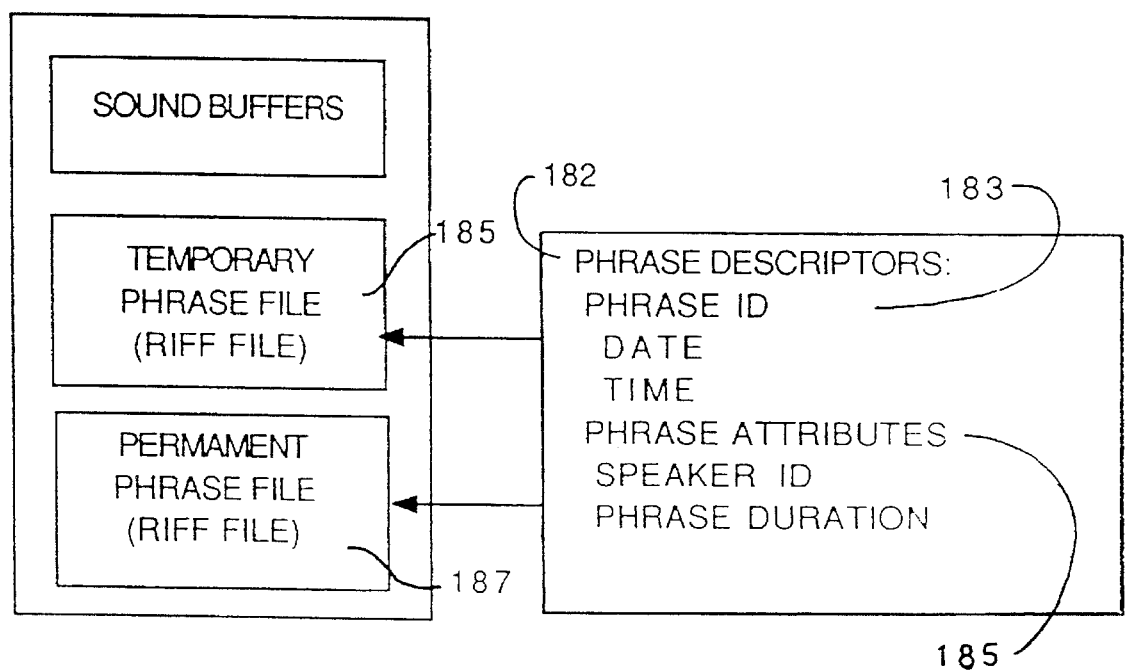

METHOD AND APPARATUS FOR MANAGING INFORMATION

CROSS REFERENCE TO RELATED UNITED STATES APPLICATION AND PCT INTERNATIONAL APPLICATION DESIGNATING THE UNITED STATES OF AMERICA

This application is a continuation of copending PCT international application number PCT/US92/08299, filed Sep. 28, 1992, designating the United states of America and which, in turn, is a continuation-in-part of U.S. patent application Ser. No. 07/768,828 filed Sep. 30, 1991 in the United States of America Patent and Trademark Office, now abandoned. Both of the above identified prior filed applications are assigned to the same Assignee as the Assignee of this Application.

BACKGROUND OF THE INVENTION

This invention relates to a method and apparatus for recording, categorizing, organizing, managing and retrieving speech information.

This invention relates particularly to a method and apparatus in which portions of a speech stream (1) can be categorized with or without a visual representation, by user command and/or by automatic recognition of speech qualities and (2) can then be selectively retrieved from a storage.

Much business information originates or is initially communicated as speech. In particular, customer requirements and satisfaction, new technology and process innovation and learning and business policy are often innovated and/or refined primarily through speech. The speech occurs in people-to-people interactions.

Many of the personal productivity tools are aimed at people-working-with-things, rather than people-working-with-people relationships. Such personal productivity tools are often aimed at document creation, information processing, and data entry and data retrieval.

Relatively few tools are aimed at supporting the creation and use of information in a people-to-people environment. For example, pens, pencils, markers, voice mail, and occasional recording devices are the most commonly used tools in a people-to-people environment.

In this people-to-people environment, a good deal of information is lost because of the difficulty of capturing the information in a useful form at the point of generation. The difficulty is caused by, on the one hand, a mismatch between keyboard entry and the circumstances in which people work by conversation; and, on the other hand, by the difficulty of retrieving recorded information effectively.

There has been, in the past ten years, a significant development of computer based personal productivity tools. Personal productivity tools such as, for example, work stations aimed at document generation and processing, networks and servers for storing and communicating large amounts of information, and facsimile machines for transparently transporting ideographic information are tools which are now taken for granted on the desk top. These tools for desk top computers are moving to highly portable computers, and these capabilities are being integrated with personal organizer software.

Recently speech tools, including mobile telephones, voice mail and voice annotation software, are also being included in or incorporated with personal computers.

Despite these advances, there still are not tools which are as effective as needed, or desired, to support the creation, retrieval and effective use of information in a people-to-people speech communication environment.

While existing personal organizer tools can be used to take some notes and to keep track of contacts and commitments, such existing personal organizer tools often, as a practical matter, fall short of being able either to capture all of the information desired or of being able to effectively retrieve the information desired in a practical, organized and/or useable way.

Pen based computers have the potential of supplying part of the answer. A pen based computer can be useful to acquire and to organize information in a meeting and to retrieve it later. However, in many circumstances, the volume of information generated in the meeting cannot be effectively captured by the pen.

One of the objects of the present invention is to treat speech as a document for accomplishing more effective information capture and retrieval. In achieving this object in accordance with the present invention, information is captured as speech, and the pen of a pen based computer is used to categorize, index, control and organize the information.

In the particular pen based computer embodiment of the present invention, as will be described below, detail can be recorded, and the person capturing the information can be free to focus on the essential notes and the disposition of the information. The person capturing the information can focus on the exchange and the work and does not need to be overly concerned with busily recording data, lest it be lost. In this embodiment of the present invention, a key feature is visual presentation of speech categories, patterns, sequences, key words and associated drawn diagrams or notes. In a spatial metaphor, this embodiment of the present invention supports searching and organization of the integrated speech information.

The patent literature reflects, to a certain extent, a recognition of some of the problems which are presented in taking adequate notes relating to speech information.

U.S. Pat. No. 4,841,387 to Rindfuss, for example, correlates positions of an audio tape with x,y coordinates of notes taken on a pad. These coordinates are used to replay the tape from selected marked locations.

U.S. Pat. No. 4,924,387 to Jeppesen discloses a system that time correlates recordings with strokes of a stenographic machine.

U.S. Pat. No. 4,627,001 to Stapleford, et al. is directed to a voice data editing system which enables an author to dictate a voice message to an analog-digital converter mechanism while concurrently entering break signals from a keyboard, simulating a paragraph break, and/or to enter from the keyboard alphanumeric text. This system operates under the control of a computer program to maintain a record indicating a unified sequence of voice data, textual data and break indications. A display unit reflects all editing changes as they are made. This system enables the author to revise, responsive to entered editing commands, a sequence record to reflect editing changes in the order of voice and character data.

The Rindfuss, Jeppesen, and Stapleford patents lack the many cross-indexing and automatic features which are needed to make a useful general purpose machine. The systems disclosed in these patents do not produce a meeting record as a complex database which may be drawn on in many and complex ways and do not provide the many indexing, mapping and replaying facilities needed to capture, organize and selectively retrieve categorized portions of the speech information.

Another type of existing people-working-with-things tool is a personal computer system which enables voice annotation to be inserted as a comment into text documents. In this technique segments of sound are incorporated into written documents by voice annotation. Using a personal computer, a location in a document can be selected, a recording mechanism built into the computer can be activated, a comment can be dictated, and the recording can then be terminated. The recording can be replayed on a similar computer by selecting the location in the text document.

This existing technique uses the speech to comment on an existing text.

It is an object of the present invention to use notes as annotations applied to speech, as will be described in more detail below. In the present invention, the notes are used to summarize and to help index the speech, rather than using the speech to comment on an existing text.

The present invention has some points of contact with existing, advanced voice compression techniques. The existing, advanced voice compression techniques are done by extracting parameters from a speech stream and the using (or sending) the extracted parameters for reconstruction of the speech (usually at some other location).

A well known example of existing, advance voice compression techniques is Linear Predictive Coding (LPC). In LPC, the physical processes through which the human vocal track produces speech are modeled by LPC. LPC uses a mathematical procedure to extract from human speech the varying parameters of the physical model. These parameters are transmitted and used to reconstruct the speech record.

The extracted parameters are characteristic of an individual's vocal tract as well as characteristic of the abstract sounds, or phonemes.

Some of these extracted parameters are therefore also useful in the speech recognition problem. For example, the fundamental pitch F+e,sez O+ee , distinguishes adult male from adult female speakers with fair reliability.

Systems, software and algorithms for the LPC process are available from a number of sources. For example, Texas Instruments provides LPC software as part of a Digital Signal Processor (DSP) product line.

Details and references on LPC and more advanced mechanisms are given in *Speech Communication* by Douglas O'Shaughnessy, published by Addison-Wesley in 1987. This publication is incorporated by reference in this application.

A classic approach to speaker recognition is an approach which looks for characteristics in the voice print. These characteristics represent vocal tract, physical and habitual differences among speakers. See, for example, U.S. Pat. No. 4,924,387 to Jeppersen noted above.

In the present invention, speaker recognition is used as an aid in finding speech passages. Therefore, fairly primitive techniques may be used in the present invention, because in many cases the present invention will be working with only a small number of speakers, perhaps only two speakers. High accuracy is usually not required, and the present invention usually has long samples to work from.

Finally, the problem of speaker recognition is trivial in some applications of the present invention. For example, when the present invention is being used on a telephone line or with multiple microphones, the speaker recognition is immediate.

The *Speech Communication* publication noted above describes a number of references, techniques and results for speaker recognition.

The publication *Neural Networks and Speech Processing* by David P. Morgan, published by Kluwer Academic Publishers in 1991 also describes a number of references, techniques and results for speaker recognition. This *Neural Networks and Speech Processing* publication is incorporated by reference in this application.

There has been considerable effort in the field of automatic translation of speech to text. A number of major companies, including American Telephone and Telegraph and International Business Machines have been working in this area.

At the present time, some products are available to do isolated word, speaker dependent recognition with vocabularies of several hundred or even a few thousand words.

If general voice translation to text ever succeeds, there will still be a need for the idiosyncratic indexing and note taking support of the present invention, as described in more detail below.

In the present invention key word recognition can be used either as an indexing aid (in which case high accuracy is not required) or as a command technique from a known speaker.

Both the *Speech Communication* publication and the *Neural Networks and Speech Processing* publication referred to above give references and describe algorithms used for speech recognition. The *Neural Networks and Speech Processing* publication points out that key word recognition is easier than general speech recognition.

Commercial applications of key word recognition include toys, medical transcription, robot control and industrial classification systems.

Dragon Systems currently builds products for automatic transcription of radiology notes and for general dictation. These products were described in a May 1991 cover story of *Business Week* magazine.

Articulate Systems, Inc. builds the Voice Navigator brand of software for the Macintosh brand of personal computer. This software is responsive to voice command and runs on a Digital Signal Processor (DSP) built by Texas Instruments, Inc. This software supports third party developers wishing to extend their system.

Recent research was summarized at "The 1992 International Conference on Acoustics, Speech, and Signal Processing" held in San Francisco, Calif. USA between March 23 and March 26. In addition to the speech compression, speaker recognition, and speech recognition topics addressed above, other topics immediately relevant to the present invention were addressed. For example, F. Chen and M. Withgott of Xerox Palo Alto Research Center (PARC) presented a paper titled, "The Use of Emphasis to Automatically Summarize a Spoken Discourse". D. O'Shaughnessy of INRS TElecomm, Canada presented a paper titled, "Automatic Recognition of hesitations in Spontaneous Speech". The latter describes means to detect filled pauses (uh and eh) in speech.

Thus, a number of parameters of speech can be recognized using existing products and techniques. These characteristics include identity of the speaker, pauses, "non-speech" utterances such as "eh" and "uh", limited key word recognition, gender of the speaker recognition, change in person speaking, etc.

The present invention uses a visual display for organizing and displaying speech information.

Graphical user interfaces having a capability of a spatial metaphor for organizing and displaying information have proved to be more useful than command orientated or line based metaphors.

The spatial metaphor is highly useful for organizing and displaying speech data base information in accordance with the present invention, as will be described in more detail below.

*The Art of Human-Computer Interface Design*, edited by Brenda Laurel and published by Addison-Wesley Publishing Company, Inc. in 1990 is a good general reference in this graphical user interface, spatial metaphor area. This publication is incorporated by reference in this application. Pages 319–334 of this publication containing a chapter entitled "Talking and Listening to Computers" describes specific speech applications.

At least one commercial vendor, MacroMind-Paracomp, Inc. (San Francisco, Calif.) sells a software product, SoudEdit Pro, that enables the user to edit, enhance, play, analyze, and store sounds. This product allows the user to combine recording hardware, some of which has been built into the Apple Macintosh family of computer products, with the computer capabilities for file management and for computation. This software allows the user to view the recorded sound wave form, the sound amplitude through time as well as the spectral view, a view of the power and frequency distribution of the sound over time.

There has been a considerable amount of recent development in object orientation techniques for personal computers and computer programs. Object orientation techniques are quite useful for organizing and retrieving information, including complex information, from a data structure.

An article entitled "Object-Oriented Programming: What's the Big Deal?" by Birrell Walsh and published in the Mar. 16, 1992 edition of *Microtimes*, published by BAM Publications, Inc., 3470 Buskirk Ave., Pleasant Hill, Calif. 94523, describes, by descriptive text and examples, how objects work. This article is incorporated by reference in this application.

In certain embodiments of the present invention, as will be described in more detail below, this object orientation technique is utilized not only to ask questions of a data structure of complex information but also of information which itself can use a rich structure of relationships.

It is an important object of the present invention to construct a method and apparatus for recording, categorizing, organizing, managing and retrieving speech information in a way which avoids problems presented by prior, existing techniques and/or in ways which were not possible with prior, existing techniques.

It is an object of the present invention to create products for users of mobile computers to enable people to gracefully capture, to index, to associate, and to retrieve information, principally speech, communicated in meetings or on the telephone.

It is a related object to provide an improved notetaking tool.

It is another object of this invention to produce a speech information tool which is useful in circumstances where valuable speech information is frequently presented and which speech information tool supports easy, natural and fast retrieval of the desired speech information.

It is another object of this invention to produce a video information tool which is useful in circumstances where valuable video information is frequently presented and which video information tool supports easy, natural and fast retrieval of the desired video information.

It is an object of the present invention to produce such a tool which has high speed quality and which is non fatiguing. It is an object of the present invention to create a tool which has features for easy and natural capture of information so that the information can be retrieved precisely.

It is an object of the present invention to produce a method and apparatus for recording, categorizing, organizing, managing and retrieving speech information such that the user is willing and is easily able to listen to the information as speech instead of reading it as text.

It is an object of the present invention to provide a method and apparatus which is a stepping stone between the existing art and a hypothetical future where machines automatically translate speech to text.

It is an object of the present invention to fit the method and apparatus of the present invention into current work habits, systems and inter-personal relationships.

It is an object of the present invention to yield improved productivity of information acquisition with few changes in the work habits of the user.

Further objects of the present invention are to:

categorize, label, tag and mark speech for later organization and recall;

associate speech with notes, drawings, text so that each explains the other;

create relationships and index or tag terms automatically and/or by pen;

provide a multitude of powerful recall, display and organize, and playback means; and manage speech as a collection of objects having properties supporting the effective use of speech as a source of information.

SUMMARY OF THE INVENTION

The present invention incorporates a method and apparatus for recording, categorizing, organizing, managing and retrieving speech information.

The present invention obtains a speech stream (a sequence of spoken words and/or expressions); stores the speech stream in at least a temporary storage; provides a visual representation of portions of the speech stream to a user; categorizes portions of the speech stream (with or without the aid of the visual representation) by user command and/or by automatic recognition of speech qualities; stores, in at least a temporary storage, structure which represents categorized portions of the speech stream; and selectively retrieves one or more of the categorized portions of the speech stream.

The speech capture, processing and recording capabilities are built in to a personal computer system.

In one specific embodiment of the present invention the personal computer is a desktop computer associated with a telephone and an attached sound pickup device.

In the use of that specific embodiment of the present invention, a technician working in the customer service center of a company, a technician can use an application program of the computer to note points from the conversation, to note his own thoughts, to relate those thoughts to what the speaker said, to classify the speech according to an agenda, and to indicate any matters which should be brought to someone else's attention, etc.

Programmatic messages correspond to these events are sent to the speech processing capabilities of the system by the application program.

The speech processing capabilities detect pauses demarking speech phrases, identify speakers, and communicate this information to the application program on the computer, also in the form of messages.

After the telephone call, the user can recall elements of the speech record as needed by referring to the notes, to a subject list, to who might have spoken, etc., or by referring to a descriptive map of the speech which correlates speech to events, importance or other matters. The identified speech may be transcribed or listened to. When playing the recalled speech, the present invention may optionally skip the identified speech pauses and non-speech utterances.

A variety of features are included in the system to make the use of the system as natural as possible.

Methods and apparatus which incorporate the features described above and which are effective to function as described above constitute further, specific objects of the invention.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWING VIEWS

FIG. 6 shows the display in the form of a pen based computer which has four windows (a note window, a category window, a speech map window and an icon window) incorporated in the display.

In FIG. 7 the particular portion of speech information which has been characterized is shown by the heavily shaded bar in the speech map window.

Figure 6:
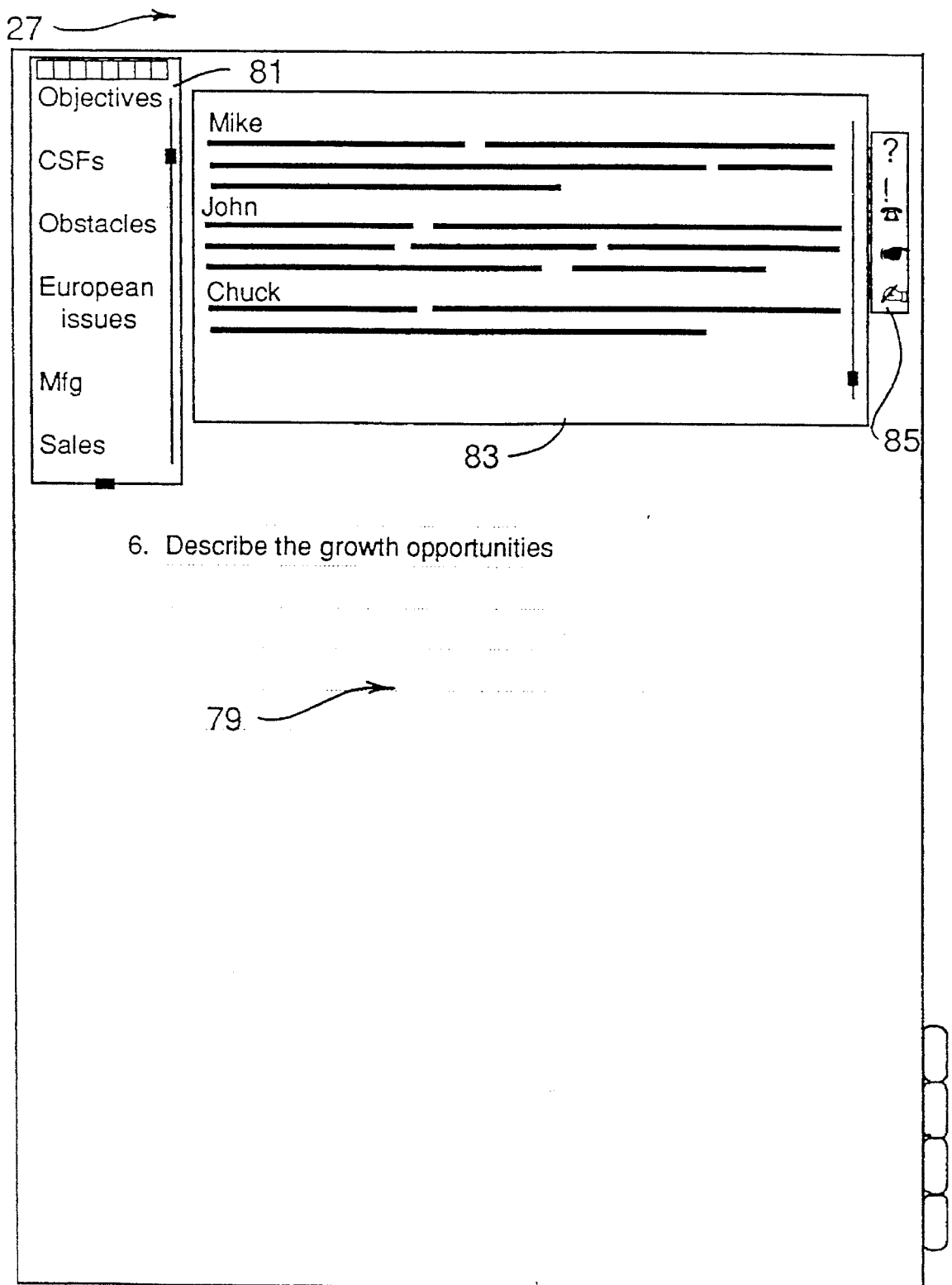
FIG. 6 is a pictorial view of the display of the personal computer shown in FIG. 1 and in FIG. 3.
Figure 7:
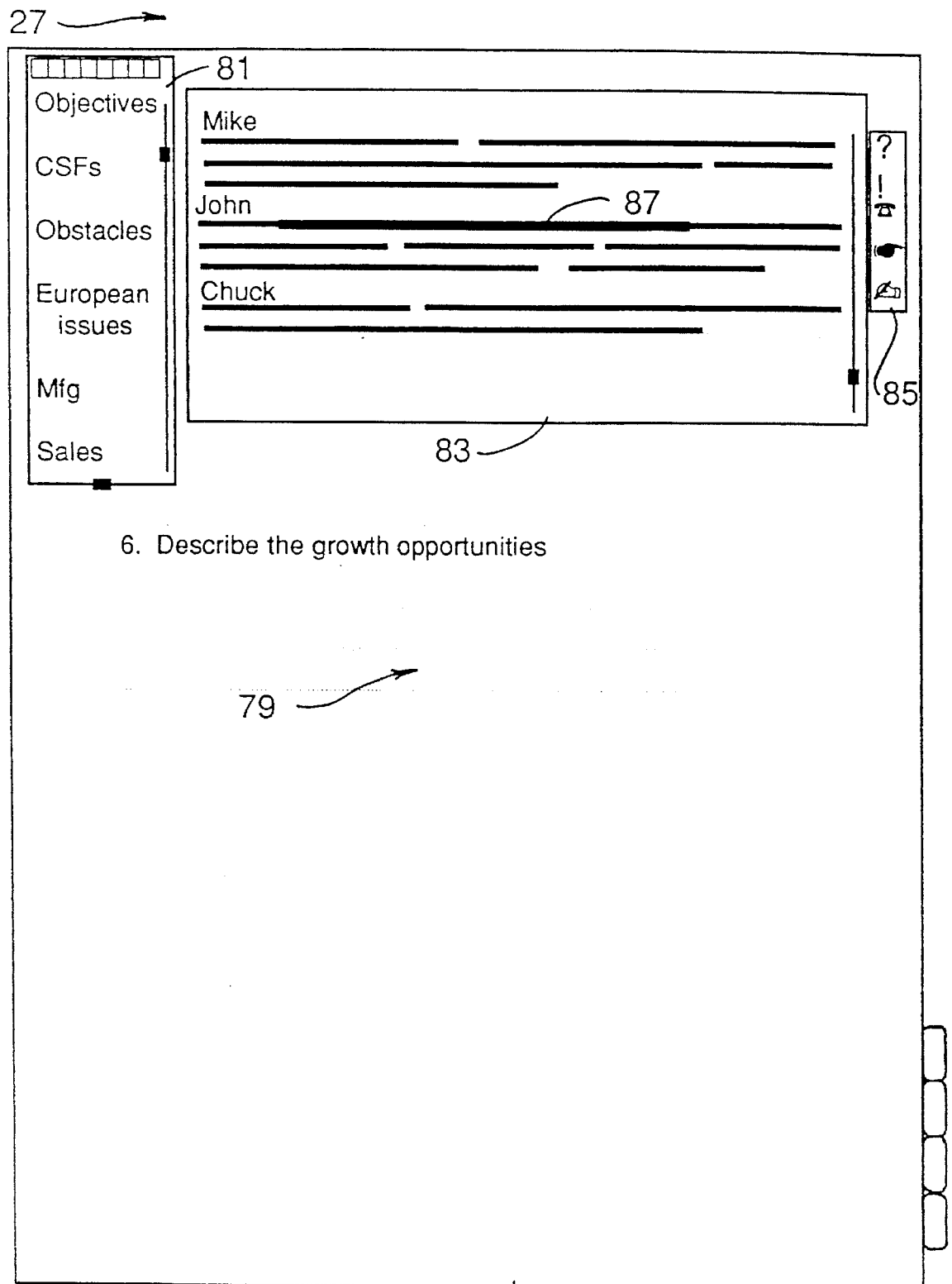
FIG. 7 is a pictorial view like FIG. 6 but showing a particular item of speech as having been selected on the speech map window for association with a note previously typed or written on the note window.
Figure 8:
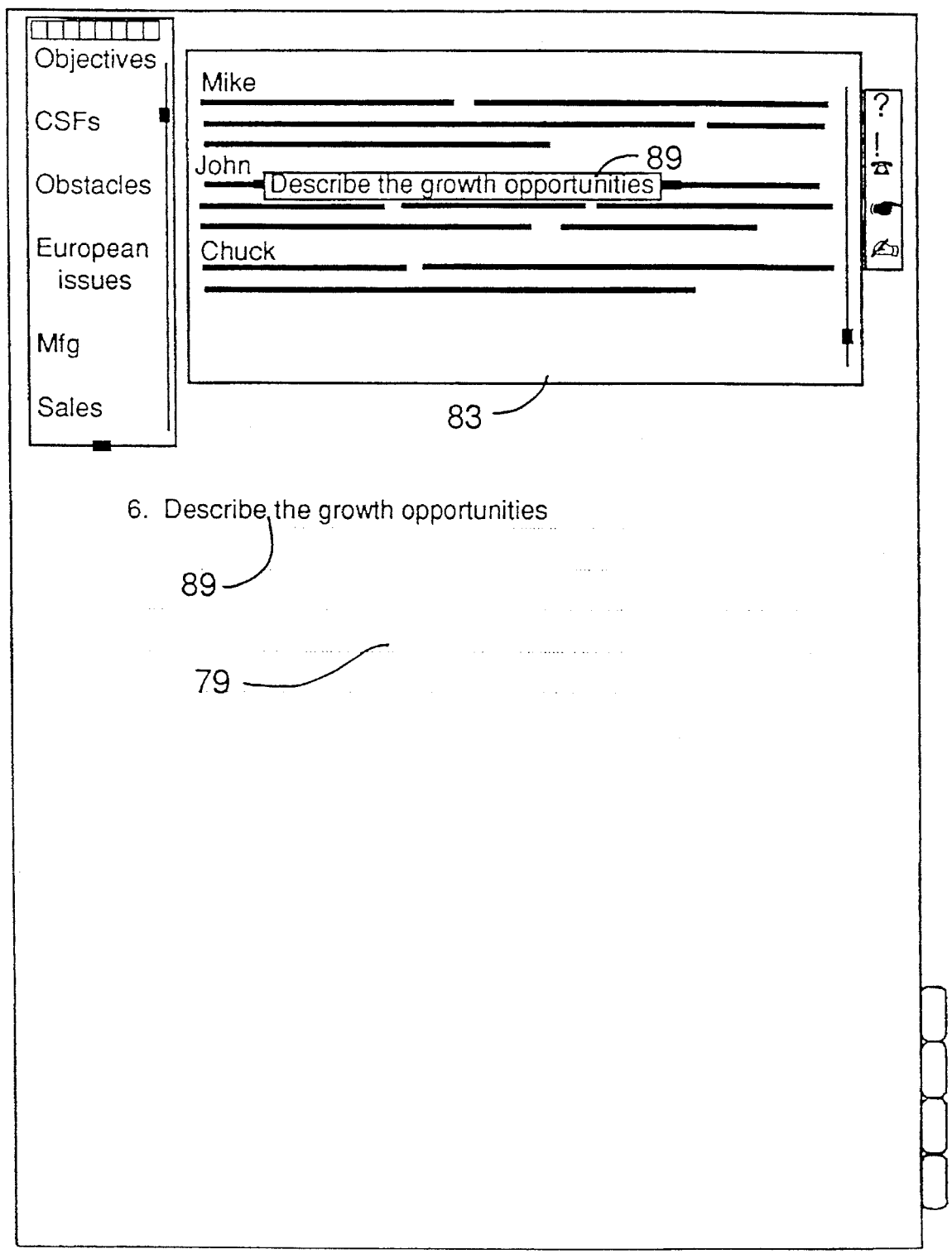
FIG. 8 is a view like FIG. 6 and FIG. 7 showing how a note from the note window can be overlaid and visually displayed to indicate the speech category on the speech map window.
Figure 9:
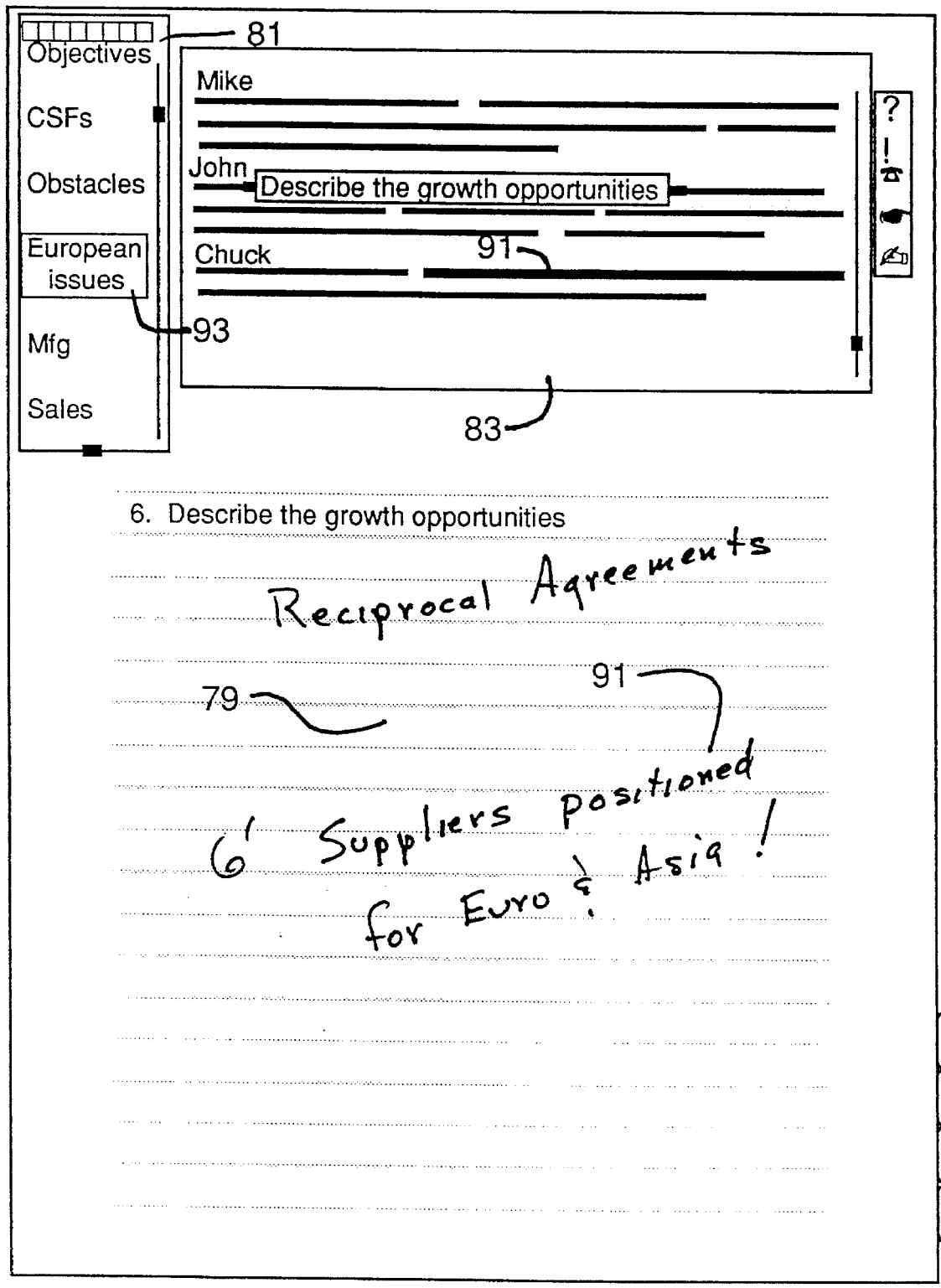

FIG. 9 is a view like FIGS. 6–8 showing a further elaboration of how additional notes have been taken on a note window and applied against some further speech as indicated in the speech map window. In FIG. 9 the notes are shown as having been applied by the heavier shading of certain horizontal lines in the speech window. FIG. 9 also shows (by shading of a category) how a selected portion of the speech is categorized by using the category window.

Figure 10:
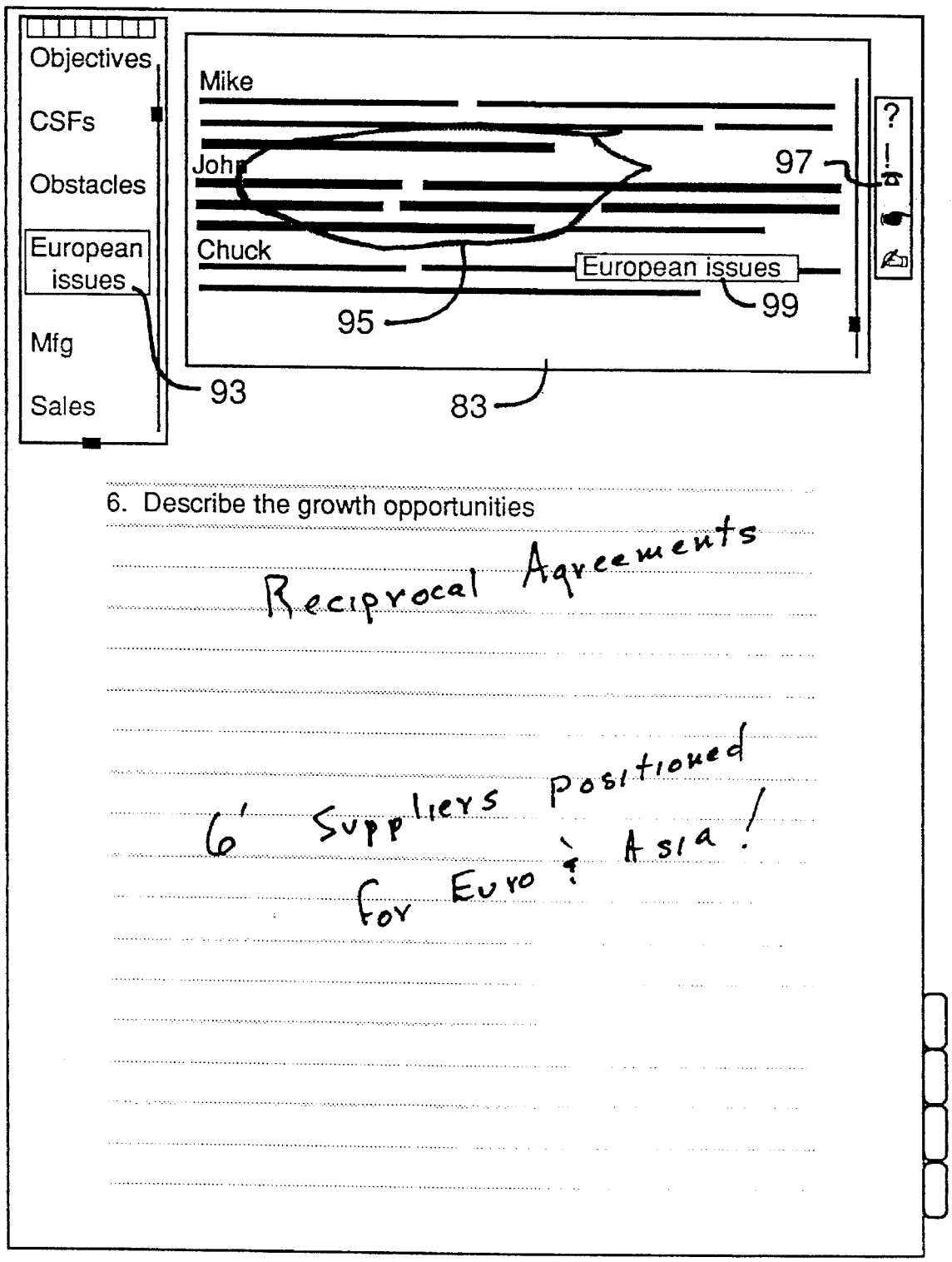

FIG. 10 is a view like FIGS. 6–9 but showing how a portion of the speech displayed on the speech map window can be encircled and selected by a "pen gesture" and have an icon applied to it (see the telephone icon shaded in FIG. 10) to create a voice mail characterization of that portion of the speech information. FIG. 10 additionally shows the selected category in FIG. 9 (the European issues category) as overlaid on a related portion of the speech information display in the speech map window.

Figure 11:
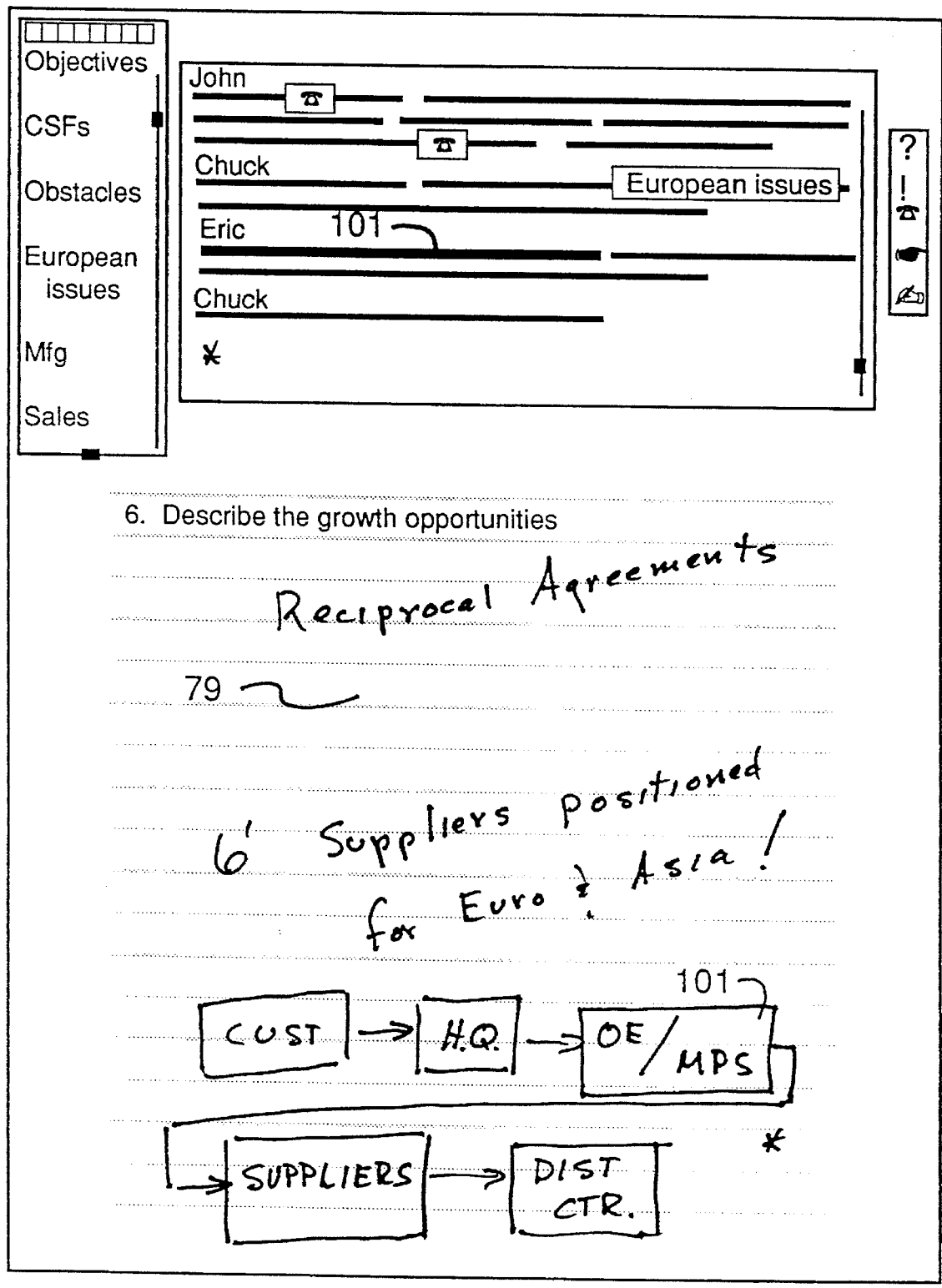

FIG. 11 is a view like FIGS. 6–10 showing how speech information can be characterized to annotate a figure drawn by the user on the note window at the bottom of FIG. 11.

Figure 12:
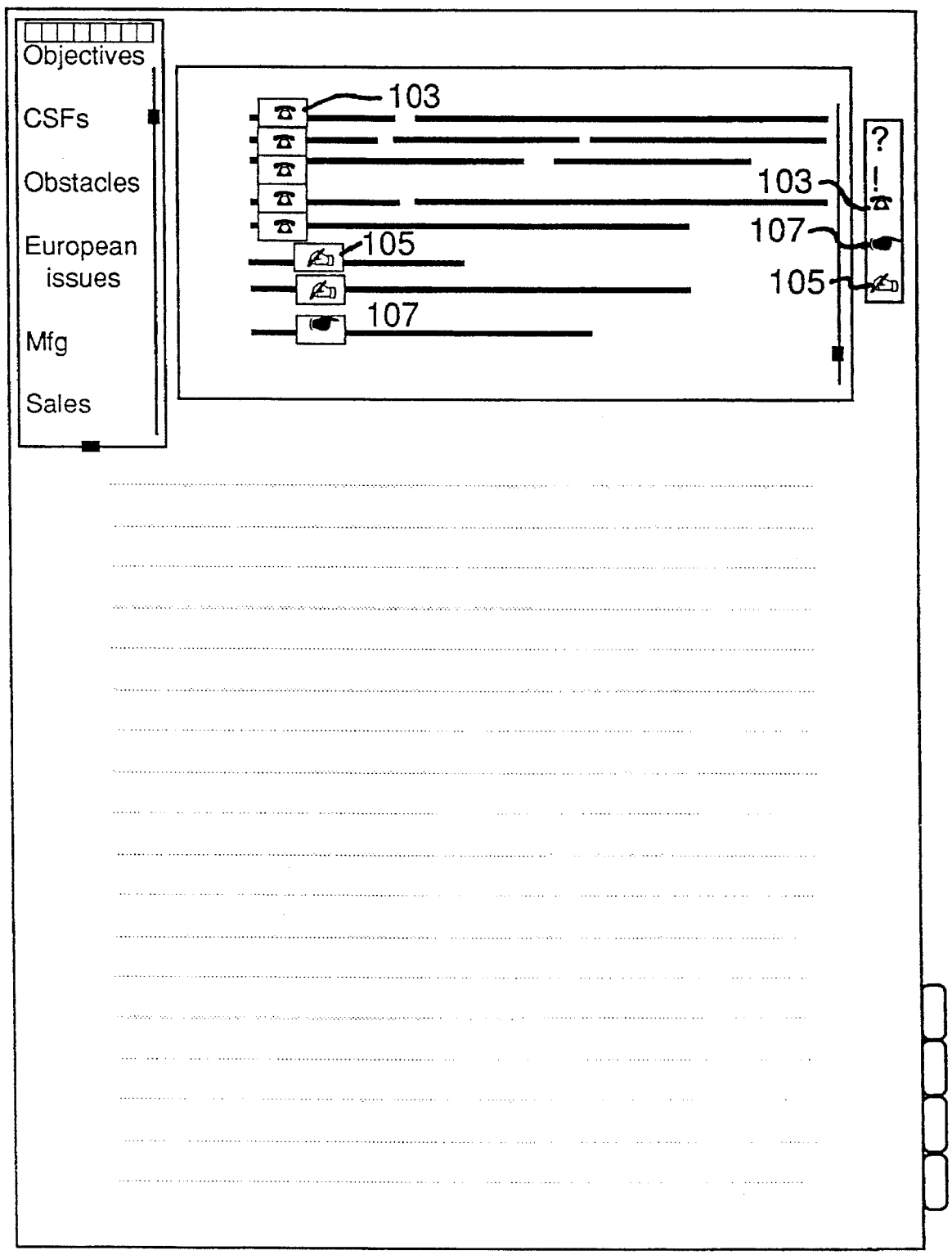

FIG. 12 is a view like FIGS. 6–11 showing how the speech information as displayed in the speech map window can automatically show the icons that need further user action to resolve them or to complete the desired action selected by the user. In FIG. 12 these item actions are shown as voice mail, schedule reminders and action item reminders.

FIG. 13 shows another visual representation on the display of the personal computer which can be used to show speech and note information organized by the categories which were previously used as tags. For example, under the category "European Issues", the visual representation shows speech by different identified speakers and also shows a note from a note window. As way of further example, FIG. 13 shows, under the category obstacles, speech portions by two different identified speakers.

Figure 14:
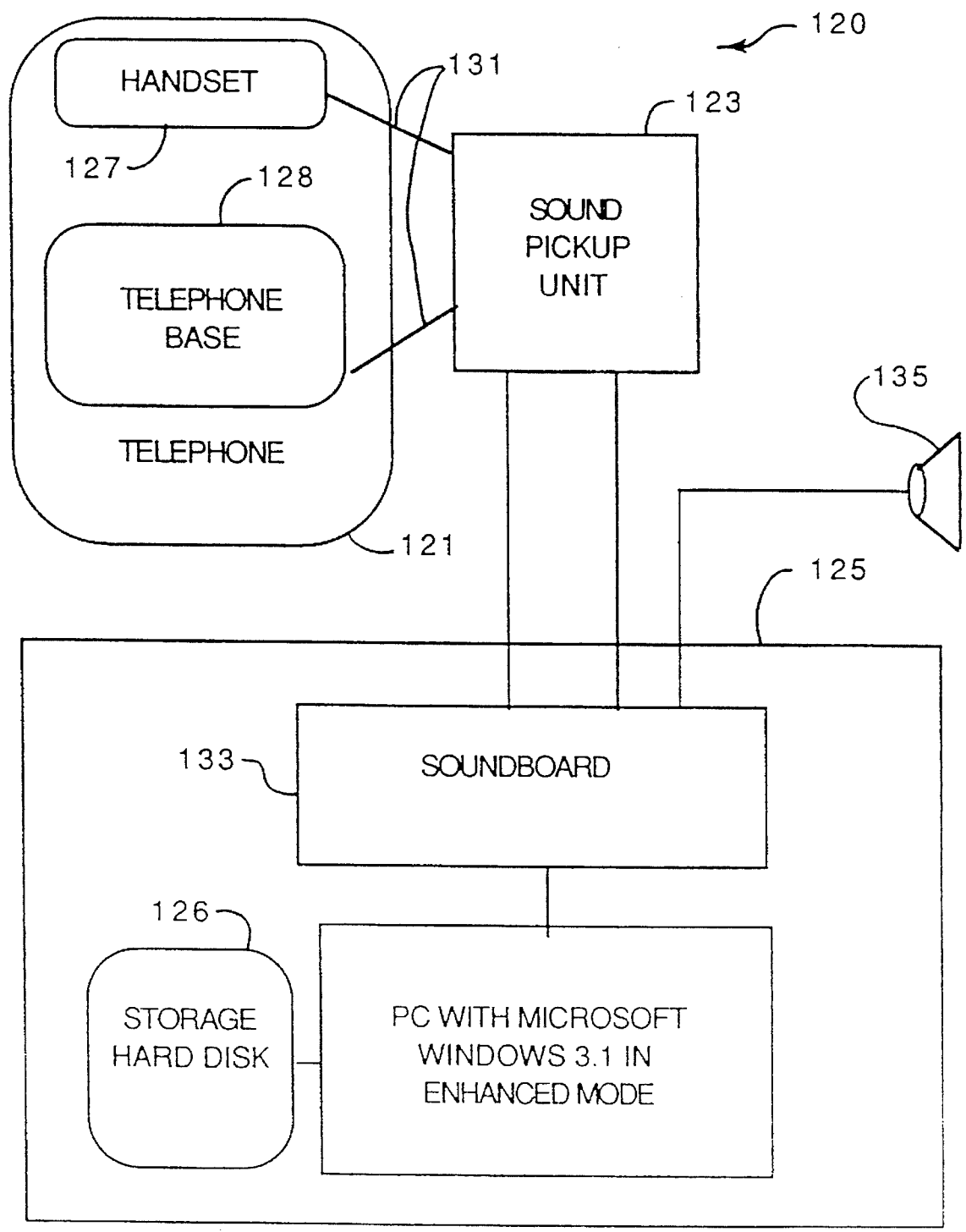

FIG. 14 is an overall block diagram view showing a system constructed in accordance with one specific embodiment of the present invention for recording, categorizing, organizing, managing and retrieving speech information received by telephone.

Figure 15:
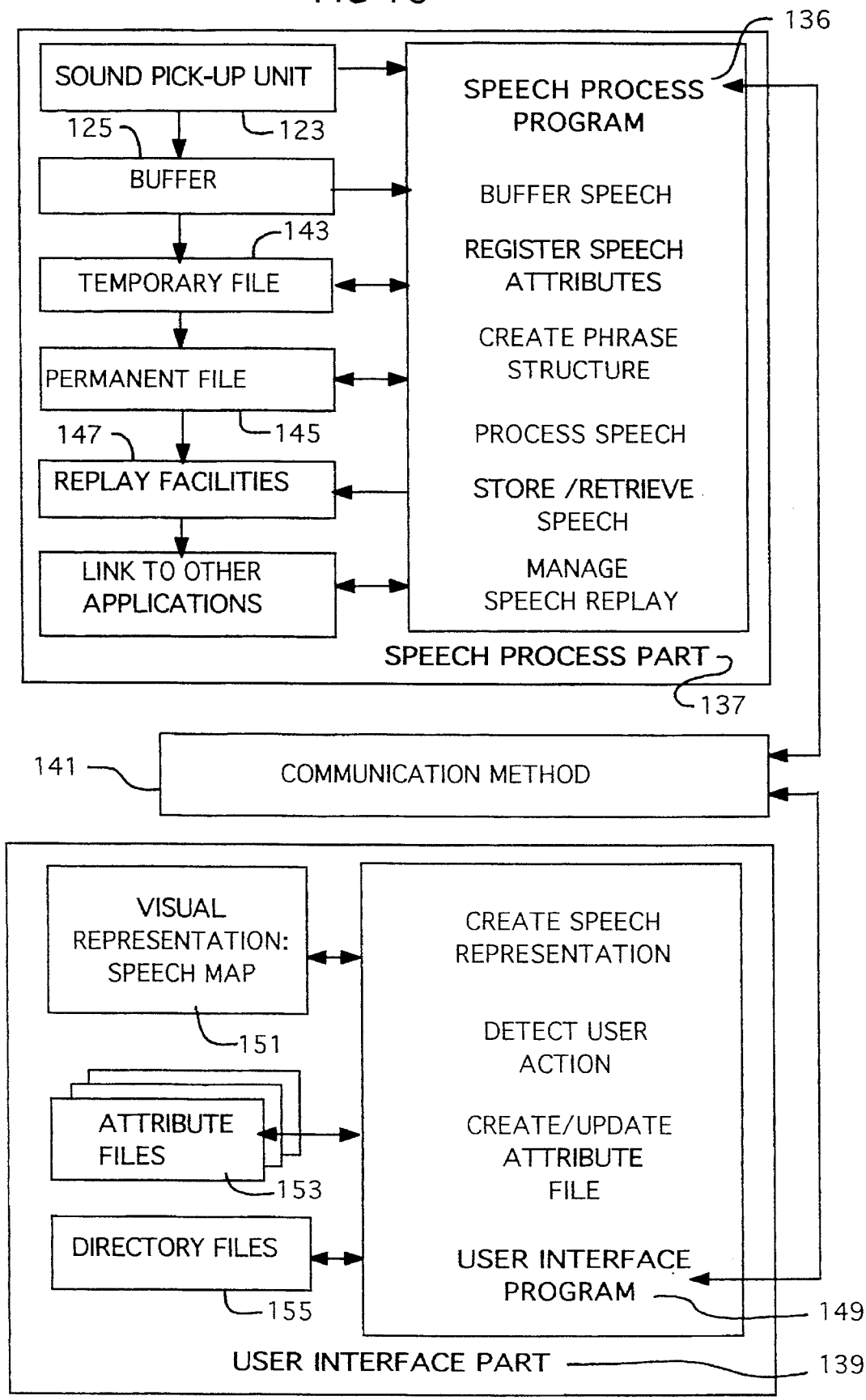

FIG. 15 shows the flow of information and the major processes of the system of FIG. 14.

Figure 16:
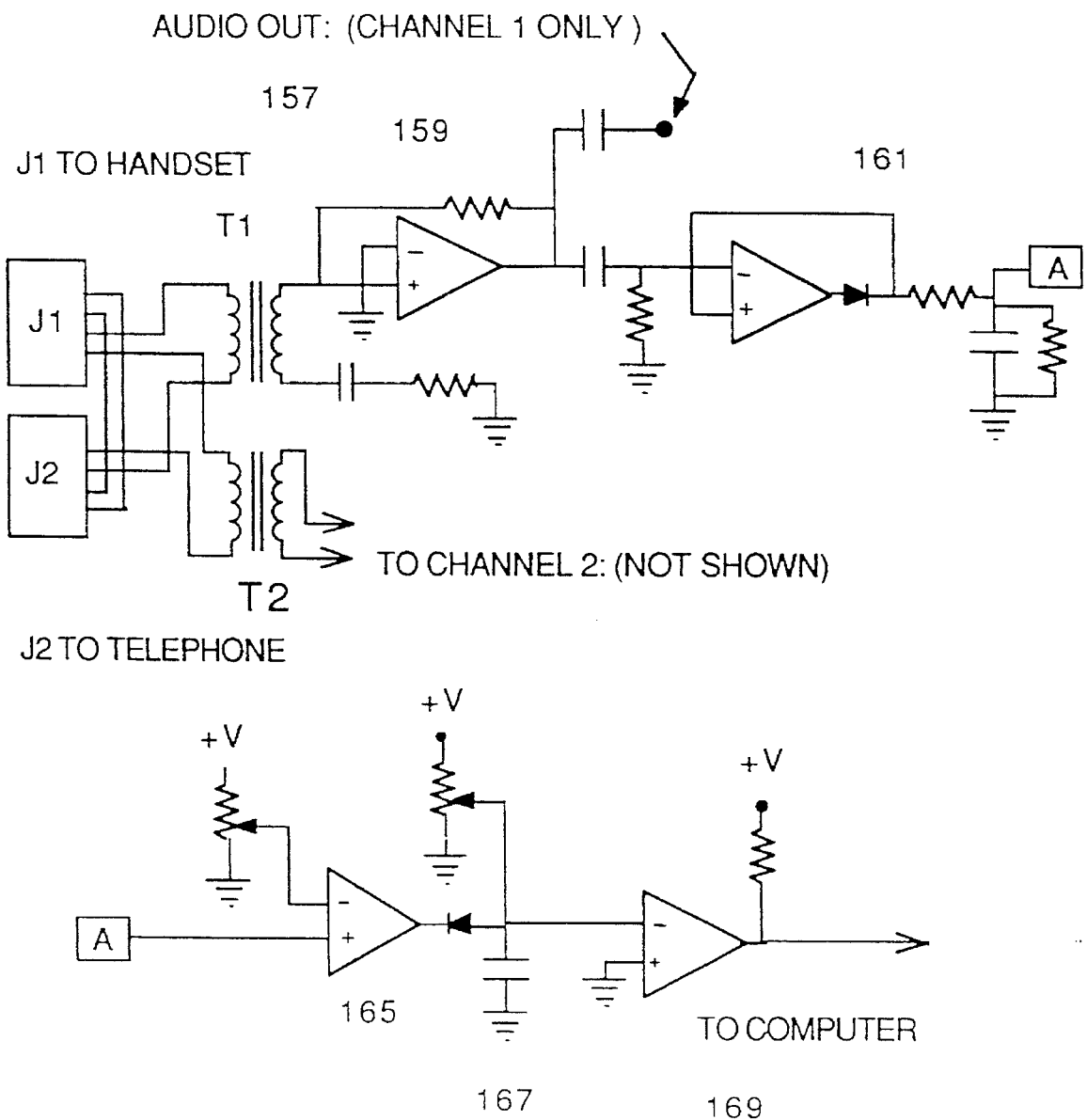

FIG. 16 shows the internal components of the sound pick-up structure shown in FIG. 14.

FIG. 17 illustrates the internal details of the software in the personal computer shown in FIG. 14.

Figure 18:
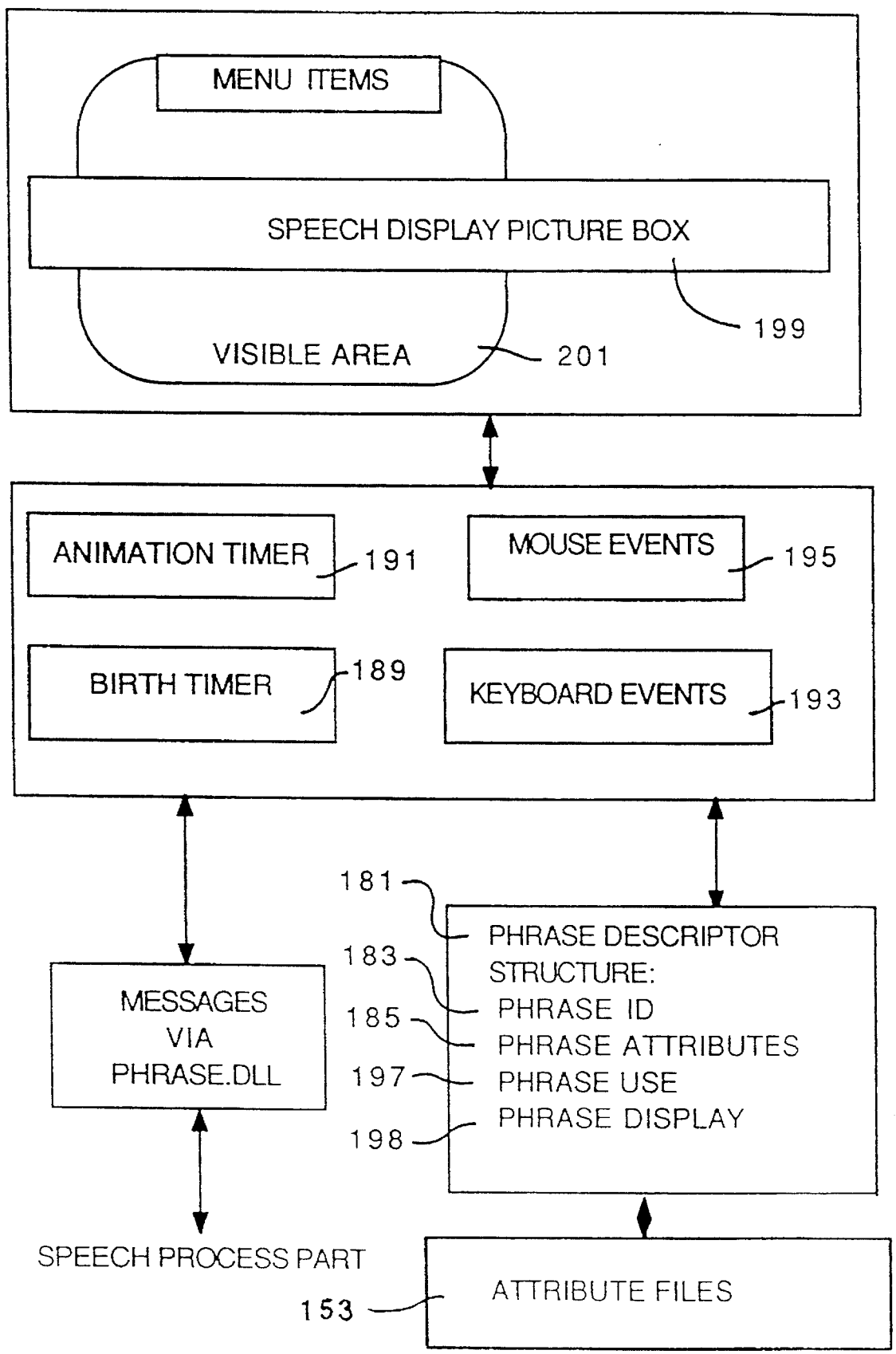

FIG. 18 shows selected data structures and program elements used within the Application portion of the software in FIG. 17.

Figure 19:
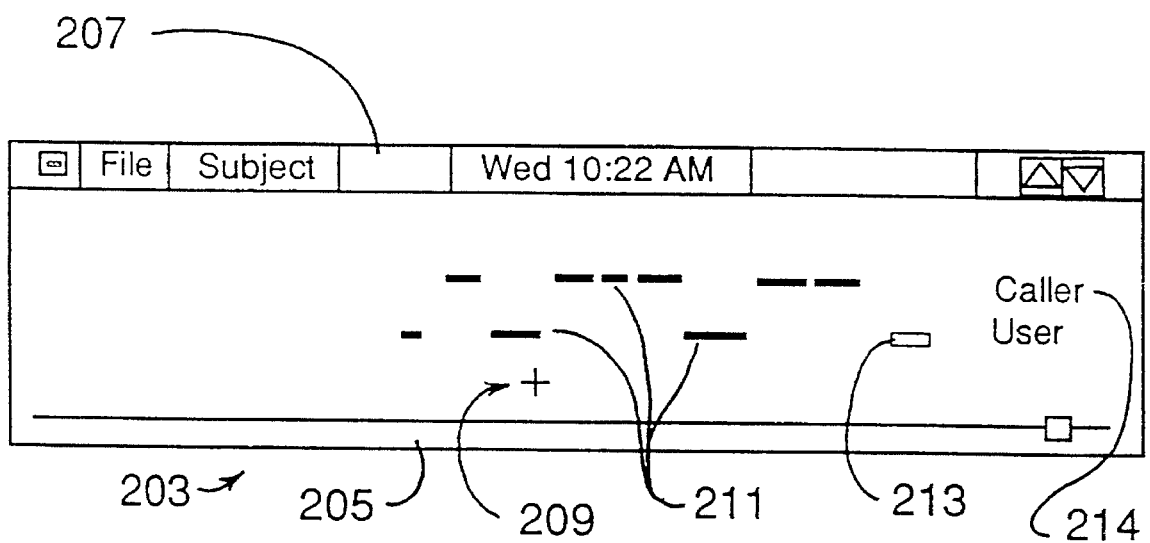

FIG. 19 is a pictorial view of the display of the personal computer shown in FIG. 14. FIG. 19 shows the display consisting of the speech map and menu used by the application program.

Figure 20:
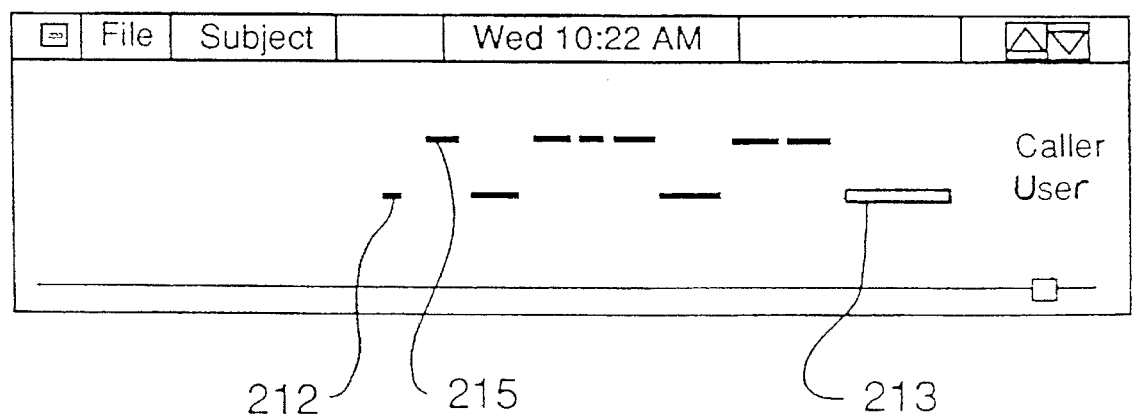

FIG. 20 is a pictorial view like FIG. 19 but showing the appearance of the display a short time after the display of FIG. 19.

Figure 21:
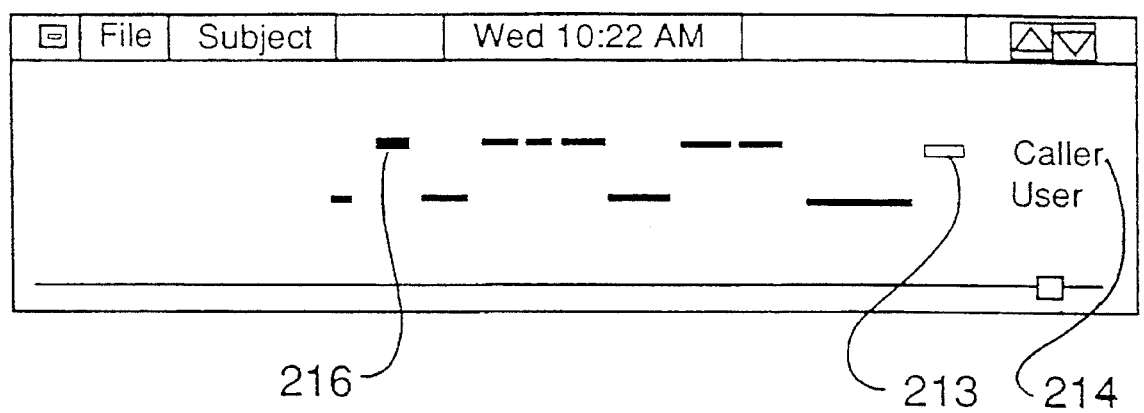

FIG. 21 is a pictorial view like FIGS. 19 and 20 but showing a particular item of speech as having been selected on the speech map for storage. This item has been characterized by the heavier shading in the speech map window.

Figure 22:
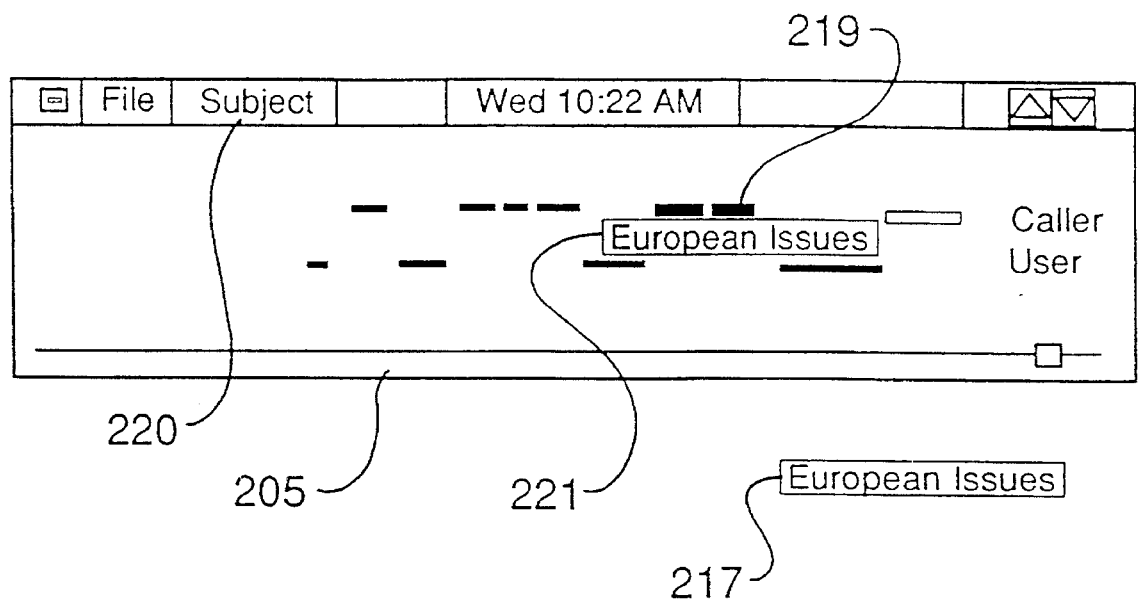

FIG. 22 is a view like FIGS. 19–21 showing how a note can be typed on the keyboard and visually displayed to indicate the speech category on the speech map window.

Figure 23:
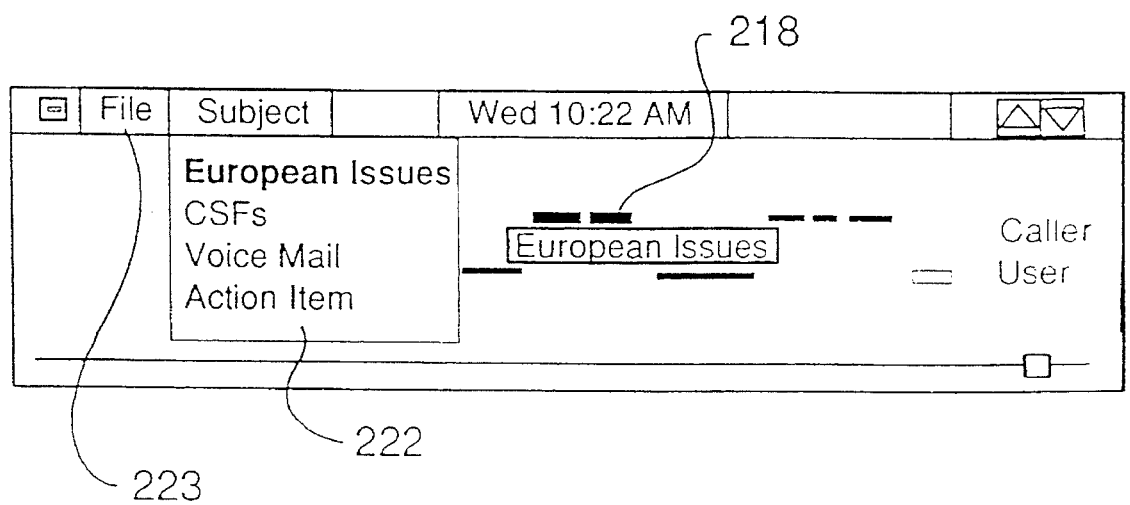

FIG. 23 is a view like FIGS. 19–22 showing a further elaboration of how additional categories have been applied by using a pull-down menu after selecting some further speech as indicated in the speech map window.

DETAILED DESCRIPTION OF THE PREFERRED EMBODIMENTS

Figure 1:
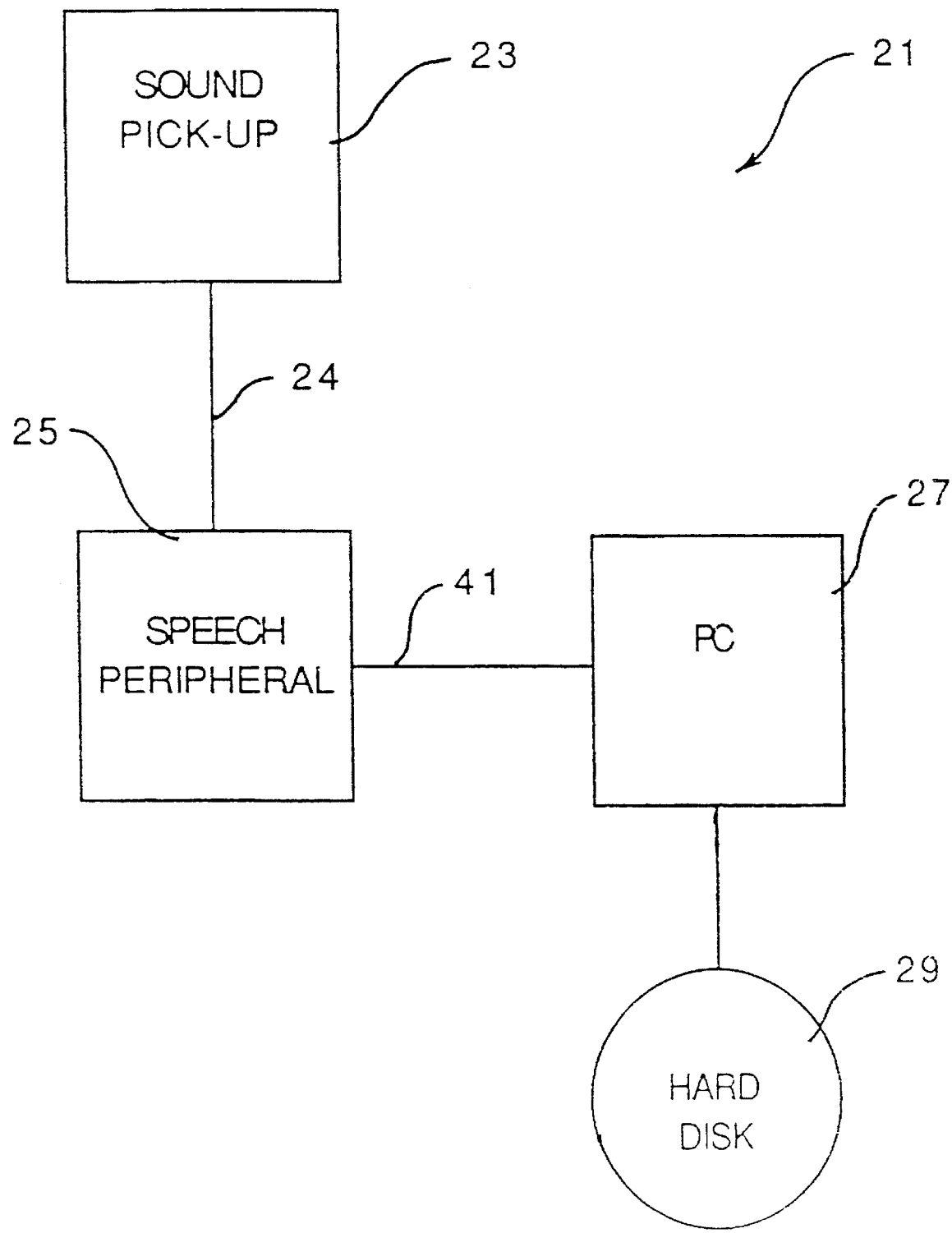
FIG. 1 is an overall, block diagram view showing a system constructed in accordance with one embodiment of the present invention for recording, categorizing, organizing, managing and retrieving speech information.

AS shown in FIG. 1 the system 21 includes sound pickup microphones 23, a speech peripheral 25, a personal computer 27, and a permanent storage 29.

The sound pickup microphones 23 comprise at least one microphone but in most cases will include two separate microphones and in some cases may include more than two microphones, depending upon the specific application. Thus, in some cases a single microphone will be adequate to pick up the speech information from one or more speakers. In the case of a car telephone application, the sound pickup microphones may comprise the input wire and the output wire for receiving and transmitting the speech information. In the case of a deposition proceeding or a multi-person conference, it may be desireable to use separate microphones for each speaker.

Figure 2:
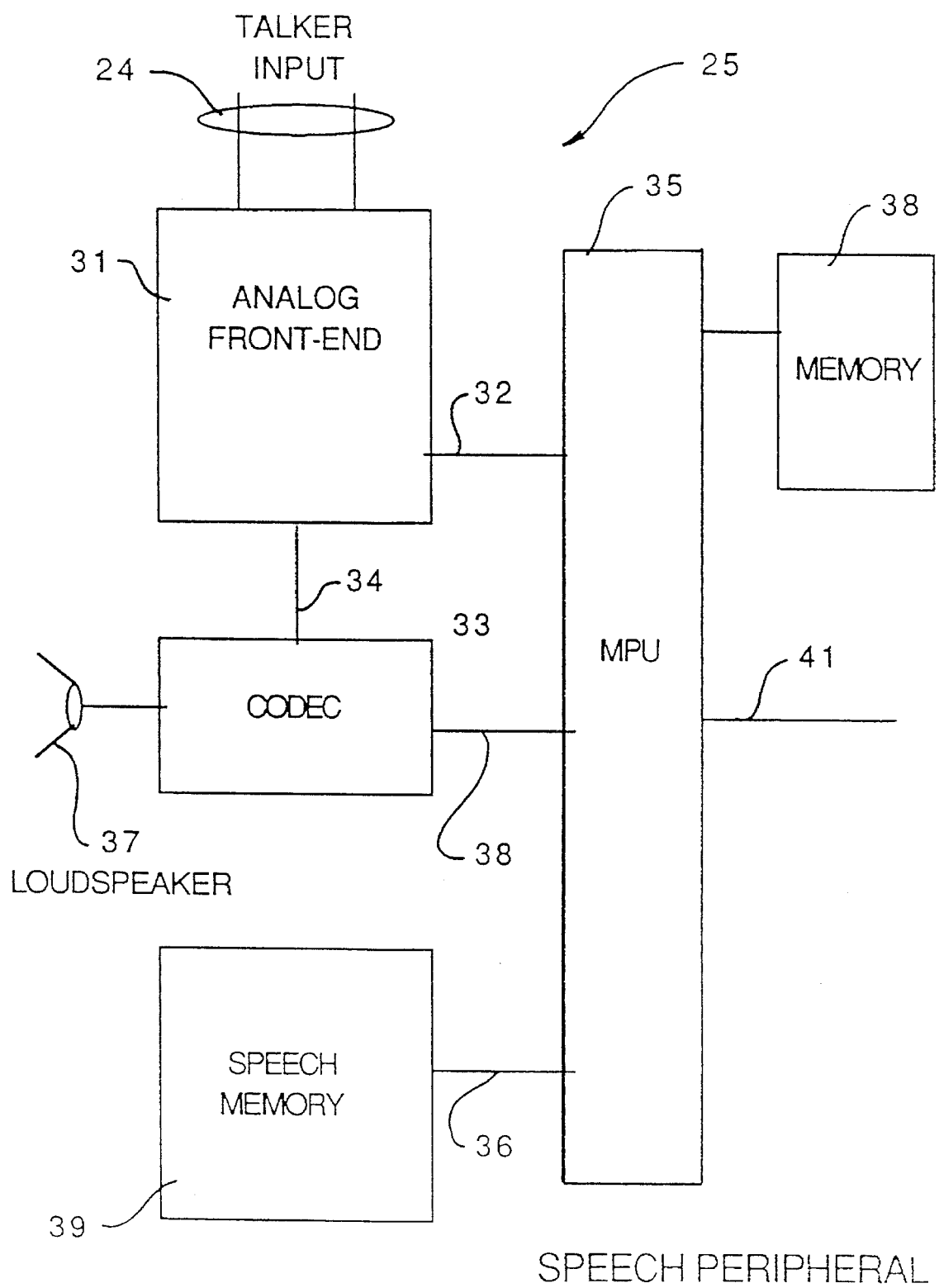
FIG. 2 shows the internal components of the speech peripheral structure shown in FIG. 1.

The speech peripheral structure 25 is shown in more detail in FIG. 2.

As shown in FIG. 2, the speech peripheral structure 25 includes an analog front end electronics component 31 for providing automatic gain control, determining who is speaking, finding gaps in speech stream, and for passing, via the control lines 32, the determination of who is speaking to a microprocessor 35. The analog front end electronics component 31 also passes, via a line 34, the sound record of the speech stream to a speech coder/decoder (codec) 33. The codec 33 receives the analog speech and transmits it, via a line 38, in digital form to the microprocessor 35.

Working in the reverse direction the codec 33 receives, via the line 38, digital speech information from the microprocessor 35 and passes the speech information to a loud speaker or phono jack 37 in analog form.

The microprocessor 35 shown in the speech peripheral structure 25 runs a computer program from the program memory 38. The microprocessor 35 stores the speech information received from the codec 33 into a speech memory array 39 which provides temporary storage.

As noted above, speech recognition techniques which are capable of identifying a particular speaker by detection of various distinguishable speech qualities, such as speech tempo, fundatmental pitch, phonemes, etc., are well known form the prior art. Such known speech recognition techniques can be advantageously utilized in the present invention, for example, as an algorithm in the MPU 35 or the analog front end 31, in order to provide additional speaker identification capability as desired.

Figure 3:
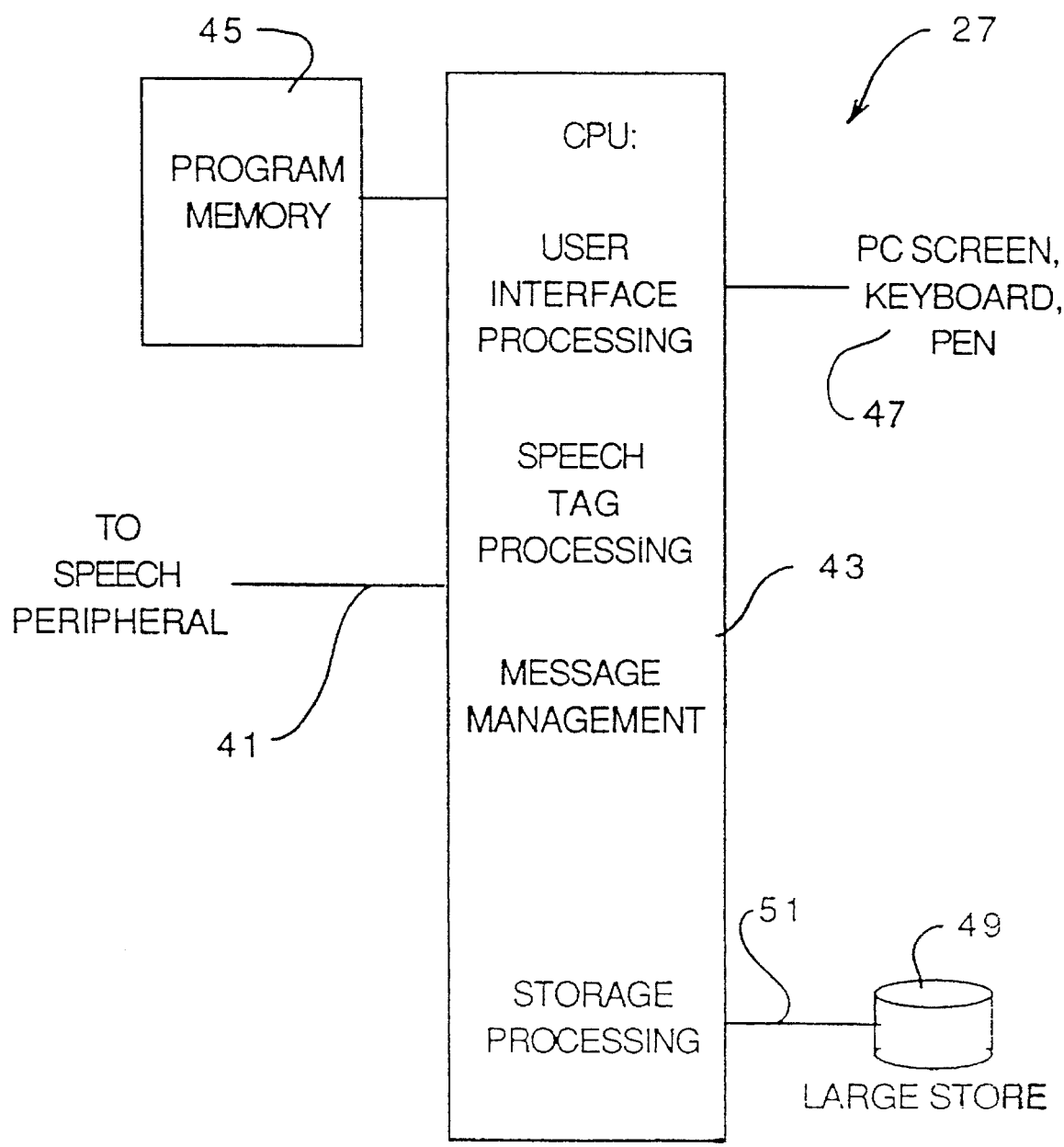
FIG. 3 shows the operative components of the personal computer and permanent storage structure shown in FIG. 1.

The microprocessor 35 is connected to the personal computer 27 (see FIG. 1) to transmit speech and control information back and forth between the microprocessor 35 and the personal computer 27, along line 41 in FIGS. 1, 2 and 3.

Certain features of the personal computer 27 are shown in FIG. 3.

The personal computer 27 is a conventional personal computer which can be either a pen based computer or a keyboard operated computer in combination with a mouse or point and click type of input device.

As shown in FIG. 3, the personal computer 27 includes a CPU 43 which is associated with a program memory 45 and with a user input/output by the line 47. The user input is shown as a keyboard or pen for transmitting user input signals on a line 47 to the CPU 43. The output is a permanent storage which is shown as a hard disk 49 connected to the CPU by a cable 51 in FIG. 3.

The personal computer 27 may additionally have connections to local area networks and to other telecommunications networks (not shown in FIG. 3).

As shown in FIG. 2 and in FIG. 3, the personal computer 27 has a connection 41 extending to the CPU 35 of the speech peripheral structure 25 for transmitting control and speech information back and forth between the personal computer 27 and the speech peripheral structure 25.

FIG. 3 shows (in caption form within the CPU 43) some of the tasks (processes) variously executed by the applications system or the operating system within the personal computer 27. These illustrated tasks include message management, storage processing, user interface processing, and speech tag processing. All of these tasks are driven by the user interface 47 acting on the control and speech information transmitted on the line 41 with the CPU 43 acting as an intermediary.

Figure 4:
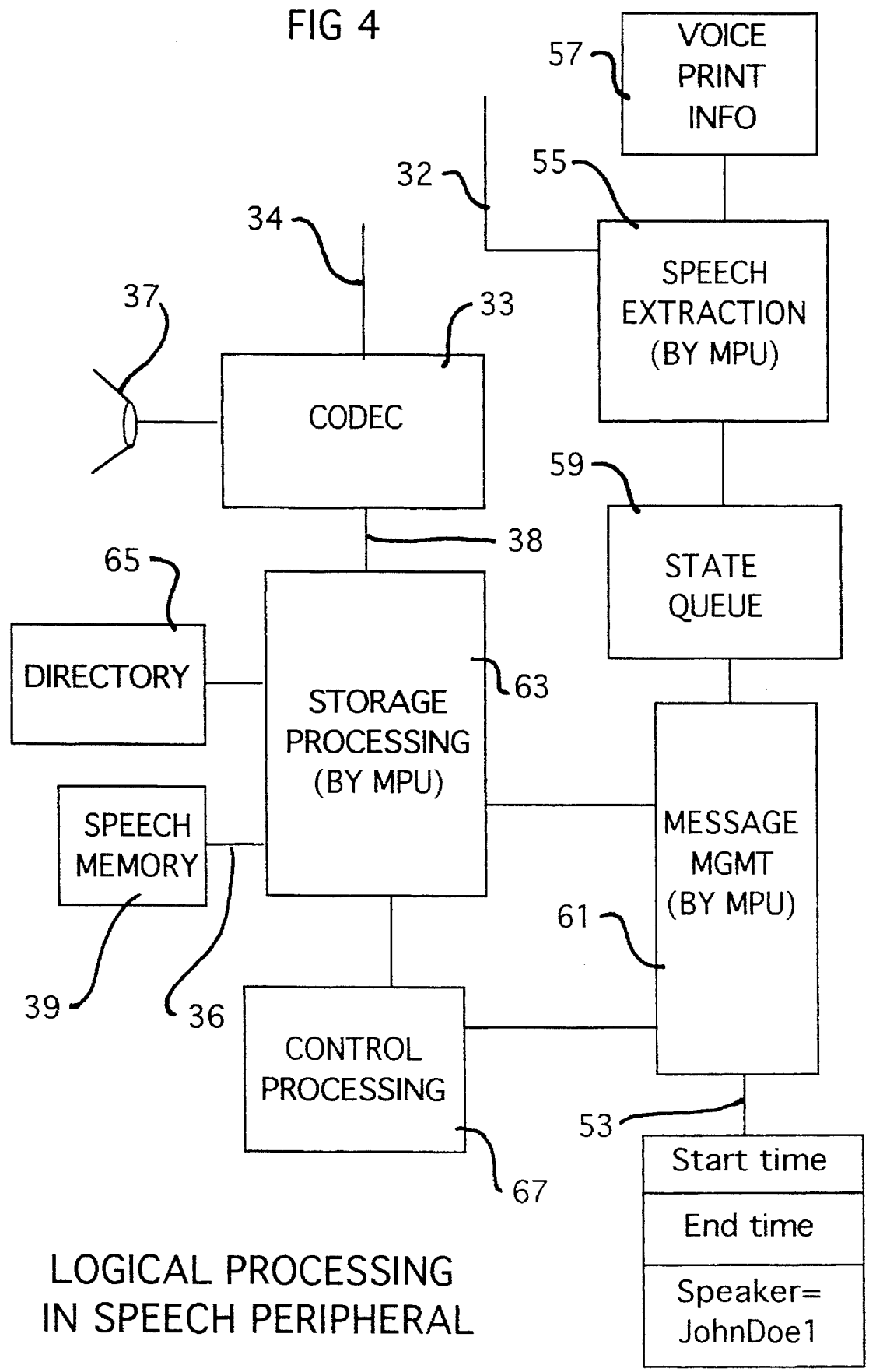
FIG. 4 illustrates details of the information flow in the speech peripheral structure shown in FIG. 2.

FIG. 4 illustrates details of the information flow in the speech peripheral structure 25 shown in FIG. 2.

AS shown in FIG. 4, digitized speech is transmitted bidirectionally, via the lines 36 and 38, between the codec 33 and the speech memory array 39. The digitized speech is stored on a temporary storage in the speech memory array 39. Speech extraction algorithms 55 executed by the microprocessor 35 work on information supplied by the analog front end electronics 31 (see FIG. 2) and optionally on the digitally stored speech in the temporary storage 39 and on voice print information kept in a table 57 by the microprocessor 35.

Changes in who is speaking, voice activity, and other extracted parameters are time stamped and put in a state queue 59.

The message management process 61, also running in the microprocessor 35, reads the changes in the state queue 59 and constructs messages to be sent to the personal computer 27 informing the personal computer 27 of the changed information. The message management process 61 also receives information from the personal computer 27 to control the operation of the speech peripheral 25.

Digitized speech streams are sent from the speech peripheral 25 to the personal computer 27 by the message management process 61. The message management process 61 works in conjunction with the storage processing process 63.

Under control of the personal computer 27, the digitized speech information contained in the temporary storage 39 is sent to the personal computer 27 by the message management process 61.

Older information to be replayed is sent by the personal computer 27 to the speech peripheral 25 and is received by the message management process 61 and sent to the storage processing process 63 where it is put in identified locations in memory 39, identified by the directory 65, for later play back by the control process 67.

Figure 5:
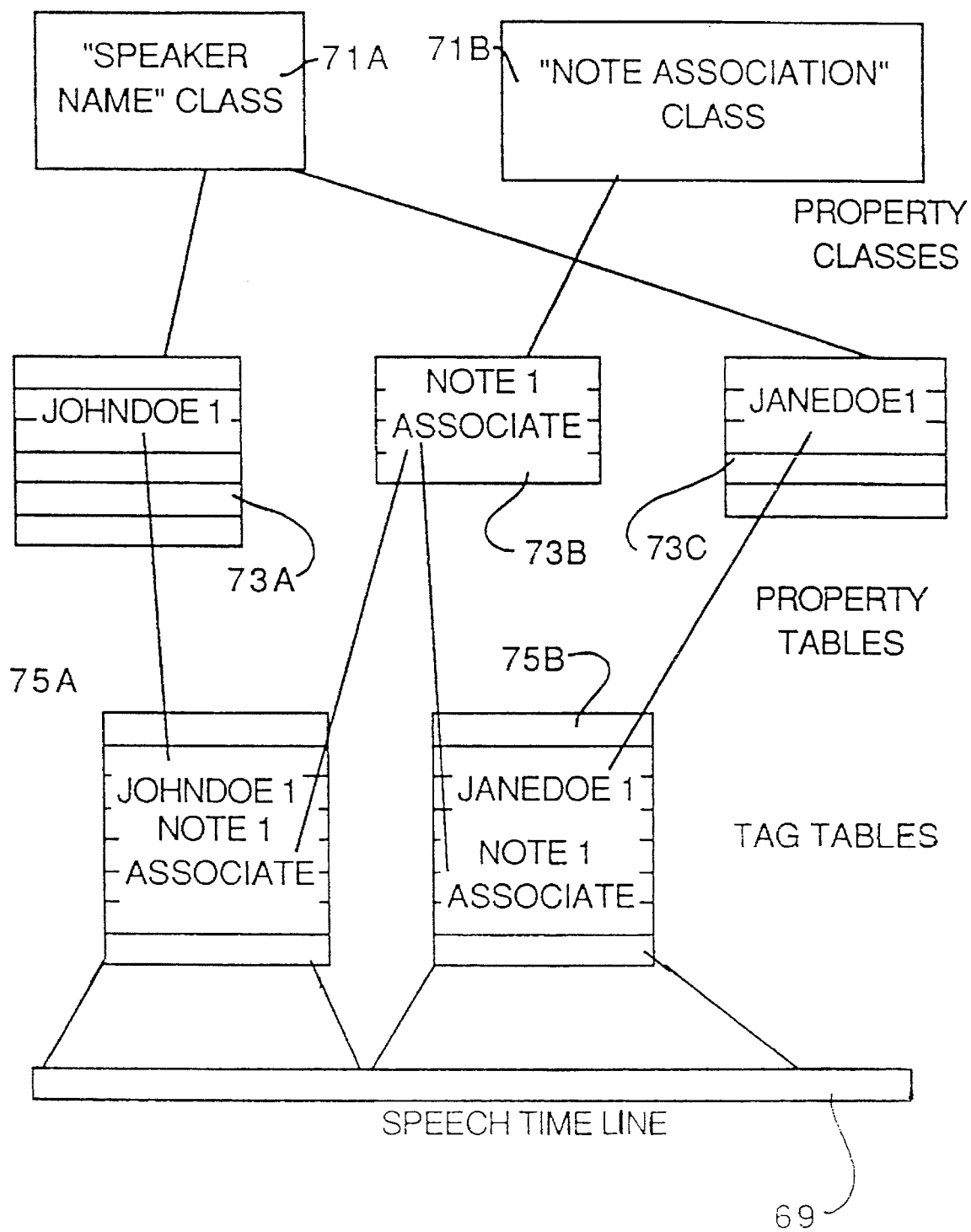
FIG. 5 shows the data structures within the personal computer (see FIG. 1 and FIG. 3).

The data structures within the personal computer 27 are shown in FIG. 5.

These data structures are used to categorize and to manage the speech information.

FIG. 5 shows a hierarchy of tables. The tables are connected by pointers (as shown in FIG. 5).

The speech timeline 69 is shown at the very bottom of FIG. 5.

The data structure tables shown in FIG. 5 served to categorize or "tag" the speech information (as represented by the speech timeline 69 shown in FIG. 5).

At the top of the FIG. 5 are the "Property Classes" (tables 71A, 71B) which can be applied to the speech. Examples of the properties include who is speaking, that an item of voice mail is to be created with that speech, or that the speech is included in some filing category.

In the middle of FIG. 5 are "Property Tables" (tables 73A, 73B, 73C) which establish the actual relation between the speech and the properties.

"Tag Tables" (tables 75A, 75B) are used to list the properties describing a certain interval of speech. The contents of each Tag Table (75A or 75B) define the beginning and the end times defined by that Tag Table and include a list of the names of additional tables which further categorize the speech. Each such name is referred to as a "Tag".

An example of a name is the identification of who is speaking.

As indicated earlier, each name refers to a "Property Table" (indicated as 73A or 73B or 73C in FIG. 5). A Property Table consists of the actual data which describes the speech, a pointer to the property class (71A or 71B) which contains computer programs for interpreting and manipulating data, and a list of the Tag Tables (75A, 75B) which refer to this particular Property Table (73A or 73B or 73C).

FIG. 6 is a pictorial view of the display 77 of the personal computer 27 shown in FIG. 1 and FIG. 3. In FIG. 6 the display 77 is shown in the form of a pen based computer which has four windows (a note window 79, a category window 81, a speech map window 83 and an icon window 85) shown as part of the display of the computer.

The note window 79 is a large window extending from just above the middle part of the screen down to the bottom of the screen. This is the area in which a user may write with a pen, construct figures, etc.

The category window 81 is shown in the upper left hand corner of FIG. 6. In this category window are listed subjects (perhaps an agenda) and user selectable indices used for tagging both the speech information (shown in the speech map window 83) and the notes in the note window 79.

The purpose of having the categories listed in the category window 81 is to permit the speech information to be retrieved by subject category rather than by temporal order.

The category window 81 permits the speech information to be tagged (so as to be retrievable either simultaneously with capture or at some later time).

The third window is the speech map window 83.

As will be more apparent from the description to follow, the present invention extracts multiple, selected features from the speech stream and constructs the visual representation of the selected features of the speech stream which is then displayed to the user in the speech map window 83.

In a preferred embodiment the speech map window shows the speech stream in a transcript format, as illustrated, with speakers identified and with pauses shown and the speech duration indicated by the length of the shaded bars.

As will be shown in the later drawing views and described in description below, the speech map window 83 may also show additional category information (see FIGS. 7, 8 and 9 to be described later).

The purpose of the speech map window 83 is to enable the selection of certain portions of the speech for storage and for categorization as desired by the user.

A further purpose of the speech map window is to enable the user to listen to the recorded speech by taking advantage of the visible cues to select a particular point for replay to start and to easily jump around within the speech information, guided by a visual sense, in order to find all of the desired information. The speech map window can be scrolled up and down (backward and forward in time) so that the visible clues can be used during the recording or at some later time.

In general, the speech map is a two dimensional representation of speech information.

A related variant of the speech map combines the notes pane and the speech pane into a single area extending the length of the display. Notes are written directly on the speech pane and shown there. Thus, the notes and the speech are interspersed as a combined document.

The preferred embodiment, by separating the notes and speech information, is better for extracting and summarizing information as in an investigative interview.

This related alternate, by combining the information, is better suited for magazine writers and other professional writers as a sort of super dictating machine useful for a group of people.

Another alternative form of the speech map, different in kind, displays the speech and category information as a multi-track tape (rather than as a dialog). In this format, the window scrolls left-to-right, like a tape, rather than up and down, like a script. Each speaker is given his own "track", separated vertically. Recognized speech qualities and assigned categories, including associations with notes, are indicated at the bottom.

A refinement applicable to any of the speech maps alters the relation between speech duration and length of the associated "speech bar". In the preferred embodiment, this relationship is linear; doubling the speech duration doubles the length of the associated bar. An alternate increases the length of the bar by a fixed amount, say 1 cm, for each doubling of the speech duration. In other words, the speech bar, in this alternate embodiment, is logarithmically related to the duration of the associated speech segment.

The final window is the icon window 85 showing ideographs representing programmatic actions which may be applied to the speech information. This is illustrated and described in more detail in FIG. 10.

FIG. 7 is a pictorial view like FIG. 6 but showing a particular item of speech as having been selected on the speech map window 83 for association with a note previously typed or written on the note window 79. In FIG. 7 the particular portion of speech information which has been characterized is shown by the heavily emphasized shaded bar portion 87 in the speech map window 83.

FIG. 8 is a view like FIG. 6 and FIG. 7 showing how a note 89 ("6. Describe the growth opportunities") from the note window 79 can be overlaid and visually displayed (in reduced form) in the speech map window 83 to indicate the speech category, namely, that the shaded speech is the response to the statement indicated in the note window.

FIG. 9 is a view like FIGS. 6–8 showing a further elaboration of how additional handwritten notes 91 have been taken on the note window 79 and applied against some further speech as indicated in the speech map window 83. In FIG. 9 the notes are shown as having been applied by the heavier bar 91 of certain horizontal lines in the speech map window. FIG. 9 also shows (by the border box 93 which encircles a category in the category window 81) how a selected portion of the speech is categorized by using the category window.

FIG. 10 is a view like FIGS. 6–9 but showing how a portion of the speech displayed on the display window can be encircled (by the encircling line 95) and selected by a "pen gesture" and can have an icon 97 applied to it (see the telephone icon 97 encircled by the border box in FIG. 10) to create a voice mail characterization of that portion of the speech information. FIG. 10 additionally shows the selected category in FIG. 9 (the European issues category 93) as selectively overlaid on a related portion 99 of the speech map information displayed in the speech map window 83.

FIG. 11 is a view like FIGS. 6–10 showing how speech map information can be characterized (see 101) to annotate a FIG. 101 drawn by the user on the note window 79 at the bottom of FIG. 11.

FIG. 12 is a view like FIGS. 6–11 showing how the speech map information as displayed in the window 83 can automatically show on the speech map the icons 103, 105, 107 that need further user action to resolve them or to complete the desired action selected by the user. In FIG. 12 these item actions are shown as voice mail 103, schedule reminder 105 and action item reminder 107.

FIG. 13 shows another visual representation on the display 77 of the personal computer 27 which can be used to show speech and handwritten note information organized by the categories which were previously used as tags. For example, under the category "European Issues", the visual representation shows speech by different identified speakers and also shows a handwritten note 88 ("Reciprocal Agreements"—see FIG. 9) from the note window 79.

Thus, with continued reference to FIG. 13, the speech may be replayed by category which replay may be in a significantly different order than the order in which the speech was originally recorded. In addition, the replayed speech may have the pauses and non-speech sounds deleted, and preferably will have such pauses and non-speech sounds deleted, so that the playback will require less time and will be more meaningful.

The extraction of speech information may be done at the time that speech is made or at a later time if the speech is recorded.

For example, the detection of the speech gaps may be made by analyzing the speech after it is recorded on a conventional tape recorder. By taking advantage of this possibility, an alternate form of the product is constructed by doing the following.

Use the speech peripheral 25 as described above in the preferred embodiment. The speech peripheral 25 detects the speech, analyzes the speech gaps, detects the speakers, time stamps these speech categories, sends the results to the PC 27 for further manual marking, etc. However, the speech is not stored at this time with the marks. Instead, it is recorded on a tape.

Then, at a later time, the tape is replayed through the speech peripheral 25. Certain parameters, such as the speech pauses, are re-detected and time stamped. The temporal pattern of these parameters is then matched with the earlier stored temporal pattern. This correlation (between the earlier stored pattern and the pattern redetected from the tape recorded speech) allows the tag tables to be set up to point to the proper segments of speech.

A telephone based system constructed in accordance with one specific embodiment of the invention is shown in FIGS. 14–23.

The telephone based system is indicated generally by the reference numeral 120 in FIG. 14.

As shown in FIG. 14 the system 120 includes a telephone 121, a sound pickup unit 123, a personal computer 125, and a permanent storage 126 which is part of said personal computer.

The telephone 121 comprises a handset 127 and a telephone base 128 that are connected by a cable which in standard practice has two pairs of wires. In this embodiment of the present invention, the sound pickup unit 123 is interposed between the handset and the telephone base to pick up the speech signals and to detect whether the speech is coming from the local talker (or user) or the remote talker (or caller) by determining which pair of wires is carrying the signal. In this embodiment, two cables 131 that pass to and from the sound pickup unit 123 replace the original standard cable. In an alternate embodiment of the current invention, said determination of the talker direction would come from an added microphone located near the telephone.

In the preferred embodiment, the personal computer 125 is an "IBM compatible PC" consisting of a 386 DX processor, at least 4 megabytes of RAM memory, 120 megabytes of hard disk storage, a Super VGA display and drive, a 101 key keyboard, a Microsoft mouse, and running MicroSoft Windows 3.1. Also added is a soundboard and driver software supported by the Multimedia extensions of Windows 3.1 and also supporting a game port. As noted, two examples of such soundboards are the Creative Labs "SoundBlaster" and the Media Vision "Thunderboard". The soundboard minimally supports a sound input jack, a sound output jack, and a 15-pin game port which is IBM compatible.

The loudspeaker 135 connects to the sound output port of the soundboard, and the sound pickup unit connects to both the game port and the sound input port.

In an alternate embodiment, the personal computer 125 is a pen based computer.

FIG. 15 shows the operation of the preferred embodiment in summary form. As noted in FIG. 15, the preferred embodiment may be broken into three parts: a speech process part 137, a user interface part 139, and a communication method between the two parts 141.

As shown in the speech process part 137, speech flows from the sound pickup unit 123 into a buffer 125, thence to a temporary file 143, and ultimately to a permanent file 145. This flow is managed by a speech process program 136. Said speech process program 136 allocates buffers to receive the real-time speech, examines the directional cues received from the sound pickup unit 123, utilizes said cues to separate the speech into phrases demarcated by perceptible pauses or changes in who is speaking, creates a temporary file 143 containing said speech marked with said phrase demarcations, and sends and receives messages from the user interface part 139 through the communication method 141. In response to messages received from the user interface part 139, the speech process part 137 may store the speech and phrase information stored in the temporary file 143 in the permanent storage 145, delete speech and phrase information from said temporary file 143, or permanent storage 145, or direct speech information to another application, or allow speech to be re-constructed and played through the replay facilities 147 that are linked to the soundboard 133. Separately, the speech process program 145 may further process the stored speech and cues to further identify speech attributes such as particular words or points of emphasis, to improve the phrase identification, or to compress the speech. Results of this further processing may also be stored in the temporary file 143 and permanent file 145 and the derived speech attributes sent to the user interface part 149 again using the communication method 141.

The program in the speech process part 137 sends messages to the user interface part 139 using the communication method 141. Said messages include the announcement, identification, and characterization of a new phrase as demarcated by the speech process part 137. As noted, said characterization includes information on which of the parties to a telephone call said the phrase, the phrase time duration, and the presence of pauses. Messages received from the user interface part 139 by the speech process program 136 in the speech process part include commands to permanently store a phrase, to delete a phrase, to re-play a phrase, or to send a phrase to another application.

In the user interface part 139, the messages sent by the speech process part 137 are received and examined by a user interface program 149. Using this information, the user interface part 139 constructs a visual representation 151 of the conversation showing the duration and speaker of each speech phrase. Using this representation 151 of the pattern of the speech, the user may select particular items of the conversation for storage, for editing, or for replay. Because this representation of the speech information shows a variety of information about the conversation and because it enables the user to navigate through the conversation using visual cues, the representation is called a "Speech Map" as noted earlier. In the preferred embodiment for telephone use, the Speech Map is shown as a two-track tape recorder having one track for each speaker. Other formats are also feasible and useful in other circumstances, as was noted in FIGS. 6–13. The user interface program 149 constructs a speech map based on the descriptions it receives of the phrases detected by the speech process part 137. In the preferred embodiment, the speech map is animated to give the user the illusion of seeing the speech phrases as they occur. To facilitate the construction of this illusion, the user interface part 139 examines the cues extracted from the speech by the sound pickup unit 123 and displays on the Speech Map the current sound activity as it occurs. The user interface part 139 detects user actions including selection of a phrase for storage and typing to label a phrase as to its subject or disposition. These user actions result in the construction of a category or attribute file 153 storing the phrase messages sent by the speech process part 137 and the user categories applied to these phrases as detected by the user interface program 149. The user actions also result in messages being sent by the user interface part 139 to the speech process part 137 as noted earlier. Finally, the user interface part 139 maintains a directory 155 of all the category files 153 so that a user may, for example, retrieve the file corresponding to a particular telephone call, examine the map constructed from the file, and select a series of phrases to listen to. These items are now described in more detail below.

The speech pickup unit 123 is shown in more detail in FIG. 16. The electronic hardware used to receive and process the speech information can be implemented in a variety of means. One of these means is described in the preferred embodiment. The implementation acquires the spoken information from a telephone conversation. The electronic circuitry within the telephone allows the user to hear from the handset earpiece both the sound of the caller's words and also the user's own voice. The electronic circuitry of this invention is attached to a telephone by intercepting the cable between the telephone and the handset. Two signals are thus acquired, the first is the combined speech signal that represents both sides of the conversation, the second is the signal from the microphone of the user's telephone handset.

The electronic circuitry of this invention processes each of these source signals independently to produce two logical output signals, the first will be a logic signal whenever either the caller of the user is speaking, the second will be a logic signal whenever the user is speaking. These two separate logic signals are routed to an appropriate input port on the computer. In the case of a "IBM Clone" personal computer this can be the "joy stick port".

The linear or "analog" audio signal that represents both sides of the spoken conversation can be separately acquired from an amplifier circuit on the channel from the earpiece (which contains both sides of the conversation). The audio signal can then be routed through a cable or other means to the input port of a commercially available "Audio Board". Two examples of such products are "Sound Blaster" which is produced by Creative Labs. Inc., and "Thunder Board" which is produced by Media Vision, Inc.

The circuitry for each of the two channels is similar. A schematic circuit diagram is shown in FIG. 16. Power for the electronic components can be provided from a battery or from the host computer. The signal from the telephone handset is isolated by transformer (T1) 157. The signal from the secondary side of the transformer is processed by an operational amplifier circuit 159 configured in a mode that converts the signal current in the transformer T1 to a voltage signal. The voltage signal then passes through a circuit that includes an operational amplifier 161 that filters (attenuates) unwanted noise that is outside of the frequency region transmitted by the telephone. A diode 163 serves to rectify the signal. The resulting signal passes through two comparator circuits. The first comparator 165 allows the adjustment of the signal level threshold that is accepted; in this manner the circuit serves as a "sensitivity" control for the speaker identification process. The comparator 165 also has components 167 that control the signal switching time so that short noise bursts within the pass-band, or short spoken utterances that are not useful for the user do not get passed to the computer. The second comparator 169 prepares the logical level of the signal to the appropriate level required by the computer, in this case a logical level zero represents the presence of a speech signal. The output from this comparator is then passed to the computer input referred to above (the game port).

FIG. 17 shows some of the sub-programs variously executed by the applications system or the operating system within the personal computer 125.

The operating system sub-programs 171 consist of the Windows 3.1 operating system, the multimedia extensions which come as part of the retail package containing the operating system, and the device drivers selectively loaded when the PC is configured. Included in said device drivers is the mouse driver, the sound board driver, and the drivers for the mass storage, keyboard, and display. Also included in the preferred embodiment are the Visual Basic language and custom controls added as part of the Visual Basic language. (Certain of the operating system tasks are also present in the system as DLLs). These sub-programs are readily available in the retail market and are ordinarily installed by either a skilled user or by the dealer.

A second group of subprograms 173 consist of code specifically written to support the preferred embodiment of the present invention. In the preferred embodiment, this code consists of one Dynamic Linked Library (DLL) and three executable application subprograms. Specifically, the DLL is called Loop DLL 175. The executable subprograms comprise the items App.exe 177, Record.exe 179, and Buffer.exe 181. Briefly, Record.exe and Buffer.exe direct the speech process part 137 of FIG. 15, and App.exe 177 directs the User Interface Part 139 of FIG. 15. These three sub-programs make calls to Loop.DLL for certain functions.

Both the interactions between Record.exe and App.exe and the interactions between Record.exe and Buffer.exe are maintained through calls to functions in Loop.DLL. In particular, Loop.DLL 175 supports a queue-based message-passing mechanism in which a sending sub-program puts messages into a queue which is then pulled and interpreted by the receiving sub-program. Loop.DLL also contains other code to rapidly retrieve information from the game port as will be described below. Certain speech processing functions including detection of "uh, and eh" (filled pauses), speech compression, and software-based speaker recognition are also provided by functions in Loop.DLL. Finally, file retrieval sub-programs are maintained in the Loop.DLL library.

When the user wishes to have the application active to record incoming telephone calls, he starts the application Record.exe 177 Record.exe 177 in turn starts Buffer.exe 181. The Windows 3.1 operating system 171 loads the Loop.DLL 175 library at this time.

Record.exe manages the interface to the multimedia extensions using the Low-level audio functions as described in the Microsoft publication *Multimedia Programmer's Workbook*. Following the conventions described in this manual, Record.exe opens the audio device represented by the sound board, manages the memory used for recording by passing buffers to the opened device, and sets up a Timer service.

In the preferred embodiment, the Multimedia responses referred to in the Multimedia *Proqrammer's Workbook* are received by Buffer.exe 181. Buffer.exe is a Windows application whose sole purpose is receiving messages and callback functions from the Multimedia low-level audio services.

When Buffer.exe receives a call-back that a data block has been filled by the wave device, it informs Record.exe of these events by sending a message through the queue mechanism maintained by Loop.DLL. The message includes the handle of the filled buffer. In response, Record.exe assigns an empty buffer to the audio device and processes the filled buffer.

Timer events are processed directly by a callback function in the DLL. When the callback function executes, it examines the values of the soundboard port as noted in FIG. 14. The function then creates a status message which is sent on a queue which is pulled by Receive.exe. The message specifies whether there is speech activity and who is speaking. These status values are also copied into local variables in the DLL so that App.exe may examine them to produce an "animation" as described later.

Thus, Record.exe pulls queues which contain "handles", as described in the Microsoft publications for programming Windows 3.1, to filled speech buffers and information on that speech. With this information, Receive.exe evaluates whether certain significant events have taken place. If a change of speaker takes place and continues for a certain period, or if sound of at least a certain first threshold duration is followed by silence of a specified second duration, Record.exe will declare that a phrase has been completed. Record.exe determines the time that the phrase began and ended. Record.exe next creates a "RIFF chunk" as specified in the Multimedia Programmer's Workbook, and posts a message to App.exe 177 using the queue mechanism in Loop.DLL 175. The RIFF chunk and the message contain a data element uniquely identifying the phrase. This data element, the Phrase ID 183 in FIG. 17 and FIG. 18, consists of the time and date of the beginning of the phrase. A further data element, the Phrase Attribute 185, containing the phrase duration, the speaker id, and optionally other phrase attributes extracted by the speech process portion of FIG. 15, is also present in both the RIFF chunk and the message. As will be described, the Phrase ID 183 is used by the software programs of the preferred embodiment to uniquely identify a phrase for storage, retrieval, and replay. The RIFF file 185 into which Record.exe is putting this information is a temporary file. When memory consumption exceeds a particular value that can be set, and no message has been received from App.exe that the speech should be saved, Record.exe discards the oldest temporary contents.

If, on the other hand, Record.exe receives a "save phrase" message from App.exe using the Loop. DLL queuing mechanism, Record.exe transfers the corresponding RIFF chunk to a permanent file 187. As noted, a "save phrase" message contains the beginning time and date of the phrase that is to be saved.

App.exe may even later send a "play phrase" message to Record.exe. The play message also contains the beginning time and date of the desired phrase as a key so Record.exe may find the correct RIFF chunk and play it.

Because Record.exe and App.exe communicated by a queue maintained in memory, and because Record.exe stores the speech in a temporary store, the user has the freedom to recognize part way into a telephone call that valuable information has been exchanged. He may at this time invoke the sub-program App.exe to actually create a representation of the current and past speech which he can then act on. Thus, in the preferred embodiment of the current invention, the user has time to hear and evaluate speech, and he has the visual cues to mark and to save the speech after he has heard it.

App.exe in the preferred embodiment is written in the Visual Basic computer language. This language permits the programmer to easily create specialized windows, timers, and file management systems.

In the preferred embodiment, the operation of App.exe is governed by the two timers, Birth Timer 189 and Animation Timer 191 shown in FIG. 18, and by user events generalized in FIG. 18 as keyboard events 193 and mouse events 195.

The Birth Timer signals App.exe to examine the queue from Record.exe. If data is present, App.exe looks at the first data item in the queue. If the data item signals that the message is a "phrase born", App.exe then removes from the queue the Phrase ID 183 and the Phrase Attribute 185. As noted, these contain the date and time of the start of the phrase and the duration of the phrase and the identification of the speaker, respectively.

When the message is pulled from the queue, App.exe creates a new entry in a data structure maintaining descriptors of each phrase. Within modern computer languages including the C and Visual Basic languages, these structures are often set up as an array of a user defined data type. In the preferred embodiment employing Visual Basic, the data type used for storing the descriptors of each phrase is sketched in FIG. 18. The phrase descriptor structure consists of the Phrase ID 183 and Phrase Attribute 185 items received from the message queue, Phrase Use 197 elements which include identification of the subject of a phrase or the use of phrases as selected by a user, and Phrase Display Data Values 198 as part of generating the user display.

App.exe then updates a display showing the phrases as will be apparent in FIGS. 19 through 23. In the preferred embodiment, the display is generated within the Visual Basic construct of a "picture box" 199 as shown in FIG. 18. The Speech Display Picture Box 199 has logical bounds that extend beyond the visible area 201 of the display screen of the computer 125 that is seen by the user.

In separate logic, the Animation Timer signals App.exe to call a function in Loop.DLL to see if anyone is speaking now. Each time that the Animation Timer executes, it updates the display animation of FIGS. 19 through 23 by moving the Speech Display Picture Box 199 a small increment to the left. This movement maintains the user's illusion of having direct access to the speech of the recent past. Additionally, the logic updates a "generator or provisional speech phrase which represents a best guess of who is speaking now and what the eventual phrase will look like. The purpose of the provisional phrase display is also to maintain the user's illusion of seeing speech as it happens now and in the recent past. In maintaining this illusion, it is particularly important that changes in speech activity such who is speaking, or a transition between active speech and silence, be shown contemporaneously with the user's perception of these changes.

User actions, such as clicking with the mouse on a phrase or typing at any time, trigger App.exe to save a phrase and to update the phrase descriptor structure 183 through program elements 193 and 195 shown on FIG. 18. The circumstances for these actions will be described in FIGS. 19–23.

When a phrase is to be saved, App.exe does the following: First, it immediately updates the display to maintain the required user illusion of working directly on the speech. Second, it updates the phrase descriptor structure 183. Finally, it sends a "Save phrase" message to Record.exe using the Loop. DLL queueing mechanism.

FIG. 19 shows a speech display that might appear when the user has enabled App.exe 177. Shown in FIG. 19 are the main application window 203, the speech map window 205, a menu bar 207, the cursor of the mouse 209, some "speech bars" 211 used as speech display elements by App.exe to represent identified phrases, and the "generator"213 representing the current speech activity.

When the user starts the program App.exe using the Windows 3.1 convention of clicking with a mouse on a program icon, App.exe starts by creating the display elements shown in FIG. 19 excepting the speech bars. The speech map window is made invisible to speed up processing as described in the Visual Basic language.

App.exe then starts examining the queue of messages from Record.exe. The phrase information in this queue is examined one phrase at a time. If the birthday of a phrase is more than a particular amount of time that can be set by the user, nominally two minutes, earlier than the current time, App.exe ignores the information. In this case, Record.exe will eventually discard the phrase.

When App.exe finds a phrase that occurred more recently than the set amount of time, it: stores this time of this "initial phrase" to mark the start of the conversation, creates a new Attribute File 153 as shown in FIG. 18, and registers the Attribute File with the Directory File of FIG. 15. App.exe then repeatedly:

Updates its local data structure to hold the new phrase information;

Initializes a graphical element or speech bar representing the phrase on the speech map window with a length proportional to the duration of the phrase as signaled in the message from Record.exe;

Places the graphical element on the speech map window at a horizontal position in the Speech Map window corresponding to when the phrase was said relative to the start of the conversation and at a vertical position corresponding to who said the phrase; and Continues with this process until the message queue is empty.

In the preferred embodiment of the present invention, the graphical element representing the phrase is given an index equal to the index of the phrase descriptor 183 element holding the information about the phrase. By this means, user action directed at the graphical element can be immediately translated into commands related to a particular phrase.

After App.exe has emptied the phrase message queue for the first time, it changes makes the Speech Map window visible and enables the Animation Timer. The user will now see the phrases that have occurred in the recent past displayed on a speech map, as in FIG. 19. As noted, IApp.exe will periodically be triggered by Birth Timer and will then again execute the steps of looking for and retrieving a message, updating the phrase data structure, and initializing and placing a speech bar on the display.

In the preferred embodiment for a telephone application, as illustrated, the speech map shows the speech as on a multi-track recording tape. In this format, the window scrolls left-to-right, like a tape. Each speaker is given his own "track", separated vertically, as illustrated, with speakers identified and with pauses shown and the speech duration indicated by the length of the shaded bars.

In the case of the telephone application described herein, the speaker or speakers located at one end of the telephone line are considered to be "local" while the speaker or speakers located at the other end of the telephone line are considered to be "remote". In a preferred embodiment, the local and remotely located speakers are assigned their own track. The information concerning a particular speaker e.g., information concerning the speakers identity, location, duration of speech phrases, pauses in speaking, etc., can be advantageously visually represented on the speech display shown in FIG. 19. In FIG. 19 the upper track is for the caller's speech, the lower track is for the user's speech. The total duration shown on the speech map window 205 is about two minutes, a duration that can be set by the user. This duration corresponds to the user's short term memory of the conversation.

As will be shown in the later drawing views and described in description below, the speech map window 205 may also show additional category information recognized by the machine or applied manually. (See FIGS. 22 and 23 to be described later.)

FIG. 20 shows the user display a short time interval later. At intervals of 0.2 second, the Animation Timer triggers. Each time the animation timer triggers, App.exe moves the entire Speech Map window a small increment to the left. This movement gives the user the illusion of looking a two-track tape recorder where the phrases spoken by each speaker are visible and are shown separately. The App.exe code triggered by the Animation Timer also examines the most recent data values received from the Sound Pickup Unit to see who, if anyone is speaking. If speech activity is detected, it is indicated by a "generator" graphical element 213 shown in FIG. 20. In FIG. 20, the user can review the recent pattern of speech. The first speech bar 212 shown is where the user picked-up the telephone and presumably said, "Hello". The second speech bar 215, in a higher position, represents the phrase uttered by the caller. In this example of use of the preferred embodiment, we assume that the caller said his name. The conversation then proceeded as shown. The user can now see this pattern of the conversation. The user has perhaps forgotten the full name spoken by the caller. He may move the mouse and command the computer to save the second phrase, where the caller said his name, by clicking on it.

FIG. 21 shows the display some time later. One additional phrase has been taken from the message queue by App.exe and added to the Speech Map using the mechanisms described earlier. The display has been moved multiple times by the code triggered by the Animation Timer. The Generator 213 has moved to the caller line 214 showing the speaker has changed.

In FIG. 21, the second speech bar 216 is heavier following the user's mouse click on that bar. When the user clicked on the bar to command App.exe to save it, the following happened:

Visual Basic detected the mouse click and passed the index of the selected display element to App.exe;

App.exe updated its local phrase attribute file to indicate that the phrase was selected.

App.exe changed the display property of the selected display element to show that it is saved and that it is currently the focus of activity. In the preferred embodiment, the display property controlling the shading of the graphical element is changed to make the element darker as shown in FIG. 21;

App.exe creates a message to Record.exe. The message consists of the "Save Phrase" message identifier followed by the time and date which uniquely identify the phrase;

Record.exe a short time later receives the message and updates the property in the RIFF Chunk representing the phrase. As mentioned earlier, this will eventually cause that RIFF chunk to be moved to permanent storage.

FIG. 22 is a pictorial view like FIG. 21 but showing a particular item of speech as having been selected on the speech map window 205 for association with a note 217 now being typed and displayed. In FIG. 22 the particular portion of speech information which has been characterized is shown by the heavier bar 219 in the speech map window 205. App.exe intercepts the keystrokes as typed by the user, enters them into the phrase data structure, writes them as a text box 221 near the selected speech phrase, and creates a "subject" menu item 220 corresponding to the typed information.

FIG. 23 is a pictorial view like FIG. 22 but showing a particular item of speech as having been selected on the speech map window 205 for association with a subject previously typed as in FIG. 22. FIG. 23 shows several speech bars 218 selected as indicated by their heavier bar. FIG. 23 further shows that the user has pulled down an element from the subject menu 222. App.exe enters this item into the "Phrase Use" element 197 of FIG. 18 and also shows the item as a label on the selected speech bars. Alternatively, the note selected from the menu could have been previously defined as a permanent data item. The association is made by the user by selecting the desired menu item. In FIG. 23, the conversation has proceeded so that earlier phrases have disappeared from the screen. The code triggered by Birth Timer calculates the position of the display elements. When the position of an element moves it off the visible area 201 of FIG. 18, this code "unloads" the display element as described in the Visual Basic language so that the computer memory does not become cluttered with old objects. Replay is initiated when the user changes the program mode from "Record" to "Play" by selecting from the "File" menu 223. When the user selects the Play mode, App.exe sends the command "FlushBuffers" to Record.exe. Record.exe now deletes the temporary file, closes the sound device, and re-opens the sound device for playback. When App.exe now detects mouse moves and clicks, it send the message "PlayPhrase" rather than "SavePhrase", but all other processing happens as before. By analogy with FIGS. 10–13, it should be clear that icons may be put on the screen for additional program actions. Again, by analogy with the earlier example, the speech may be replayed by category which replay may be in a significantly different order than the order in which the speech was originally recorded. In addition, the replayed speech may have the pauses and nonspeech sounds deleted, and preferably will have such pauses and nonspeech sounds deleted, so that the playback will require less time and will be more meaningful.

The preferred embodiment describes the use of the invention for obtaining, storing, categorizing and labeling a speech stream (an audio record of spoken information). The methods and apparatus of this invention are also applicable to obtaining, storing, categorizing and labeling a video stream (a video record of spoken and visual information). The video stream methods and apparatus use the audio information stream in the various ways described in detail above to permit the capture and later recall of desired visual and/or audio information.

While we have illustrated and described the preferred embodiments of my invention, it is to be understood that these are capable of variation and modification, and we therefore do not wish to be limited to the precise details set forth, but desire to avail ourselves of such changes and alterations as fall within the purview of the following claims.

We claim:

1. A method for recording, categorizing, organizing, managing and retrieving speech information, said method comprising, a. obtaining a speech stream, b. storing the speech stream in at least a temporary storage, c. extracting multiple, selected features from the speech stream, wherein the multiple features include the speaker's identity or location, duration of speech phrases, and pauses in speaking, d. constructing a visual representation of the selected features of the speech stream, e. providing the visual representation to a user, f. categorizing portions of the speech stream, with or without the aid of the representation, by at least one of the following categorization techniques:
 user command and,
 automatic recognition of speech qualities, including tempo, fundamental pitch, and phonemes, and g. storing, in at least a temporary storage, data structure which represents the categorized portions of the speech stream.

2. The invention defined in claim 1 including directing the speech stream, as initially obtained, to a permanent storage.

3. The invention defined in claim 1 including selectively retrieving one or more of the categorized portions of the speech stream.

4. The invention defined in claim 1 including controlling, under user control, display format of the representation for display of categories of particular interest.

5. The invention defined in claim 1 wherein the visual representation of the speech stream and the storage of the speech stream in at least a temporary storage enable the categorizing of the portions of the speech stream to be done by a user at a time subsequent to an initial obtaining of the speech stream including at a time which occurs later than the initial obtaining of the speech stream.

6. The invention defined in claim 1 wherein the categorization is done by reference only to the visual representation without the need to actually listen to the speech itself.

7. The invention defined in claim 1 wherein the visual representation is employed by a user to select the portion of the speech to be retrieved.

8. The invention defined in claim 1 wherein the categorization determines which portions of the speech stream are saved in permanent storage.

9. The invention defined in claim 1 wherein the visual representation shows patterns of the speech that occurr over a period of time during the obtaining of the speech stream.

10. The invention defined in claim 1 which includes forming as part of the visual representation a document which includes category headings and wherein selected categorized portions of one or more speech streams are incorporated in the document, being located under a respective category heading of the document.

11. The invention defined in claim 1 wherein the visual representation includes overlays indicating a particular categorization applied to a particular portion of the speech stream.

12. The invention defined in claim 1 including marking the visual representation to select portions of the speech for further processing.

13. The invention defined in claim 12 wherein the further processing includes preparation of speech for voice mail.

14. The invention defined in claim 12 wherein the further processing includes at least one of the following:

selection of speech for noting on a calendar, and selection of speech for updating a schedule.

15. The invention defined in claim 12 wherein the further processing includes the provision of alarms for automatically reminding the user of alarm events.

16. The invention defined in claim 1 wherein the categorizing includes the step of integrating of reference notes, including both manual and programmed notes, within the stored data structure of the speech stream.

17. The invention defined in claim 16 wherein the integrating of the notes occurs concurrently with obtaining the speech stream.

18. The invention defined in claim 16 wherein the integrating of notes occurs after the speech stream is obtained.

19. The method defined in claim 1 wherein the categorizing includes automatically detecting and recording and visually displaying the speaker's identity, pauses, non-speech sounds, emphasis, laughter, or pre-selected key words as pre-programmed by a user.

20. The invention defined in claim 1 wherein the speech stream comes from a telephone call.

21. The invention defined in claim 20 wherein the categorization includes categorizing by caller identity, date of telephone call, number called, time of the telephone call, and duration of the telephone call.

22. The invention defined in claim 1 wherein the thresholds of automatic categorization are under user control.

23. The invention defined in claim 1 which includes selectively retrieving categorized portions of the speech stream in any desired order for subsequent processing including audio play back and transcription, and wherein the selectively retrieving comprises both including and excluding by category.

24. The invention defined in claim 23 wherein the excluding by category comprises excluding pauses and non-speech sounds to thereby reduce the amount of time required for the selective retrieval and to improve the clarity and understanding of the retrieved categorization portions of the speech stream.

25. The invention defined in claim 1 wherein the selectively retrieving includes initially retrieving only every $n^{th}$ utterance, as demarcated by detected speech pauses, in order to speed up searching and replaying.

26. A method for recording, categorizing, organizing, managing and retrieving speech information transmitted by telephone, said method comprising, a. obtaining a speech stream from a telephone connection, b. storing the speech stream in at least a temporary storage, c. extracting multiple, selected features from the speech stream, wherein the multiple features include the speaker's identity or location, duration of speech phrases, and pauses in speaking.

d. categorizing portions of the speech stream by user command or by automatic recognition of speech qualities, including tempo, fundamental pitch, and phonemes, and wherein the categorizing portions of the speech stream includes categorizing the speaker by indicating which end of the telephone connection the speech is coming from, e. storing, in at least a temporary storage, data structure which represents the categorized portions of the speech stream, and f. selectively retrieving one or more of the categorized portions of the speech stream.

27. A method of recording speech, said method comprising, capturing the speech, storing the captured speech in a temporary storage, extracting multiple, selected features from the speech stream, wherein the multiple features include the speaker's location, duration of speech phrases, and pauses in speaking, representing selected, extracted features of the speech in a visual form to the user, using the visual representation to select portions of the speech for storage and including the step of looking at the visual representation of the captured speech in the temporary storage and selectively categorizing portions of that speech, with the aid of the visual representation, after the speech has been captured in the temporary storage.

28. A method for recording and indexing speech information, said method comprising, obtaining a speech stream, storing the entire speech stream as an unannotated speech stream in a first, separate storage, automatically recognizing qualities of the speech stream, including tempo, fundamental pitch, and phonemes, categorizing portions of the speech stream by user command, and by association with the automatically recognized qualities, storing the categorized portions together with said automatically recognized qualities in a second storage, synchronizing at least a portion of the obtained speech stream with both the stored categorized portions and the stored automatically recognized qualities, and compiling the automatically recognized qualities with the categorized portions as compiled speech information in a manner which permits the compiled speech information to be organized, managed, and selectively retrieved by a user.

29. A speech information apparatus for recording, categorizing, organizing, managing and retrieving speech information, said apparatus comprising, a. speech stream means for obtaining a speech stream,
  b. first storage means for storing the speech stream in at least a temporary storage,
  c. extracting means for extracting multiple, selected features from the speech stream, and wherein the multiple features include the speaker's identity or location, duration of speech phrases, and pauses in speaking,
  d. constructing means for constructing a visual representation of the selected features of the speech stream,
  e. visual representation means for providing the visual representation to a user,
  f. categorizing means for categorizing portions of the speech stream, with or without the aid of the representation, by at least one of the following categorizing techniques:
    user command and,
    automatic recognition of speech qualities, including tempo, fundamental pitch, and phonemes, and
  g. second storage means for storing, in at least a temporary storage, data structure which represents the categorized portions of the speech stream.

30. The invention defined in claim 29 including directing means for directing the speech stream, as initially obtained, to a permanent storage.

31. The invention defined in claim 29 including retrieving means for selectively retrieving one or more of the categorized portions of the speech stream.

32. The invention defined in claim 29 including formatting means for controlling, under user control, a display format of the representation for display of categories of particular interest.

33. The invention defined in claim 29 wherein the visual representation of the speech stream in the visual means and the storage of the speech stream in at least a temporary storage in the first storage means enable the categorizing of the portions of the speech stream to be done by a user at a time subsequent to an initial obtaining of the speech stream including at a time which occurs later than the initial obtaining of the speech stream.

34. The invention defined in claim 29 wherein the categorization in the categorizing means is done by reference only to a visual representation in the visual means without the need to actually listen to the speech itself.

35. The invention defined in claim 29 wherein the visual representation in the visual means is employed by a user to select the portion of the speech to be retrieved.

36. The invention defined in claim 29 wherein the categorization produced in the categorizing means determines which portions of the speech stream are saved in permanent storage.

37. The invention defined in claim 29 wherein the visual representation in the visual means shows patterns of the speech that occurr over a period of time during the obtaining of the speech stream.

38. The invention defined in claim 29 wherein the visual representation in the visual means takes the form of a document having category headings, and wherein selected categorized portions of one or more speech streams are incorporated in the document, being located under a respective category heading of the document.

39. The invention defined in claim 29 wherein the visual representation in the visual means includes overlays indicating a particular categorization applied to a particular portion of the speech stream.

40. The invention defined in claim 29 including processing means for processing selected items in accordance with programmed instrucitons and including marking means for marking the visual representation in the visual means to select portions of the speech for further processing in the processing means of those marked portions of the visual representations and related speech stream.

41. The invention defined in claim 40 wherein the further processing in the processing means includes preparation of speech for voice mail.

42. The invention defined in claim 40 wherein the further processing in the processing means includes at least one of the following:
  selection of speech for noting on a calendar, and
  selection of speech for updating a schedule.

43. The invention defined in claim 40 wherein the further processing in the processing means includes the provision of alarms for automatically reminding the user of alarm events.

44. The invention defined in claim 29 wherein the categorizing means include integrating means for integrating reference notes, including both manual and programmed notes, within the stored data structure of the speech stream.

45. The invention defined in claim 44 wherein the integrating of the notes in the integrating means can be done concurrently with the obtaining of the speech stream.

46. The invention defined in claim 44 wherein the integrating of the notes in the integrating means can be done after the speech stream is obtained.

47. The invention defined in claim 29 wherein the categorizing means includes automatically detect and record and visually display on the visual means the speaker's identity, pauses, non speech sounds, emphasis, laughter, and pre-selected key words as pre-programmed by a user.

48. The invention defined in claim 29 wherein the speech stream comes from a telephone call.

49. The invention defined in claim 48 wherein the categorizing means categorize automatically by caller identity, date of the telephone call, number called, time of the telephone call, and duration of the telephone call.

50. The invention defined in claim 29 wherein the thresholds of automatic categorizations are under user control.

51. The invention defined in claim 29 which includes retrieving means for selectively retrieving categorized portions of the speech stream in any desired order for subsequent processing including audio play back and transcription, and wherein the retrieving means comprises both means for including and means for excluding by category.

52. The invention defined in claim 51 wherein the means for excluding by category excludes pauses and non-speech sounds to thereby reduce the amount of time required for the selective retrieval and to improve the clarity and understanding of the retrieved categorized portions of the speech stream.

53. The invention defined in claim 29 wherein the retrieving means for selectively retrieving includes means for initially retrieving only every $n^{th}$ utterance, as demarcated by detected speech pauses, in order to speed up searching and replaying.

54. A speech information apparatus for recording, categorizing, organizing, managing and retrieving speech information transmitted by telephone, said apparatus comprising, a. a speech stream means for obtaining a speech stream from a telephone call, b. first storage means for storing the speech stream in at least a temporary storage, c. extracting means for extracting multiple, selected features from the speech stream, wherein the multiple features include the speaker's identity or location, duration of speech phrases, and pauses in speaking, d. categorizing means for categorizing portions of the speech stream by user command or by automatic recognition of speech qualities, including tempo, fundamental pitch, and phonemes, e. second storage means for storing, in at least a temporary storage, structure which represents the categorized portions of the speech stream, and f. retrieving means for selectively retrieving one or more of the categorized portions of the speech stream, and g. wherein the speech portions are categorized in the categorizing means by speaker by indicating which end of the telephone connection the speech is coming from.

55. A speech information apparatus for recording speech, said apparatus comprising, capture means for capturing the speech, temporary storage means for storing captured speech in a temporary storage, extracting means for extracting multiple, selected features from the speech, wherein the multiple features include the speaker's location, duration of speech phrases, and pauses in speaking, visual representation means for representing selected, extracted features of the speech in a visual form to a user, selection means for using the visual representation to select portions of the speech for storage, and including visual means for looking at the captured speech in the temporary store and categorizing means for selectively categorizing portions of that speech, with the aid of the visual representation, after the speech has been captured and stored in the temporary storage means.

56. A speech information apparatus for recording and indexing speech information, said apparatus comprising, speech stream means for obtaining a speech stream, first storage means for storing an entire speech stream as an unannotated speech stream in a first storage, automatic categorizing means for automatically recognizing qualities of the speech stream, including tempo, fundamental pitch, and phonemes, user command means for categorizing portions of the speech stream by user command and by association with the automatically recognized qualities, second storage means separate from the first storage means for storing the categorized portions of the speech stream together with the automatically recognized qualities, synchronizing means for synchronizing at least a portion of the obtained speech stream with the categorized portions and the automatically recognized qualities stored in said second storage, and compiling means for compiling the automatically recognized qualities with the categorized portions as compiled speech information in a manner which permits the compiled speech information to be organized, managed, selectively retrieved by a user.

57. A video information apparatus for recording, categorizing, organizing, managing and retrieving video information, said apparatus comprising, a. stream means for obtaining a video stream, b. first storage means for storing the speech stream in at least a temporary storage, c. extracting means for extracting multiple, selected features from the video stream, d. constructing means for constructing a visual representation of the selected features of the video stream, e. visual means for providing the visual representation to a user, f. categorizing means for categorizing portions of the speech stream by user command or by automatic recognition of visual or audio qualities, and g. second storage means for storing, in at least a temporary storage, structure which represents the categorized portions of the speech stream.

* * * * *